US008839139B2

(12) United States Patent
Leukart et al.

(10) Patent No.: US 8,839,139 B2
(45) Date of Patent: Sep. 16, 2014

(54) USER INTERFACE FOR PROVIDING TASK MANAGEMENT AND CALENDAR INFORMATION

(75) Inventors: Richard H. Leukart, Seattle, WA (US);
Glenn L. Frankel, Seattle, WA (US);
Stephen D. Jensen, Monroe, WA (US);
Hernan Savastano, Seattle, WA (US);
Cheryl L. Williams, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 112 days.

(21) Appl. No.: 12/777,287

(22) Filed: May 11, 2010

(65) Prior Publication Data
US 2010/0223575 A1    Sep. 2, 2010

Related U.S. Application Data

(63) Continuation of application No. 10/955,928, filed on Sep. 30, 2004, now Pat. No. 7,747,966.

(51) Int. Cl.
*G06F 3/048* (2013.01)
*G06Q 10/10* (2012.01)
(52) U.S. Cl.
CPC .......... *G06Q 10/109* (2013.01); *Y10S 715/963* (2013.01); *Y10S 715/967* (2013.01); *G06Q 10/1093* (2013.01); *Y10S 715/968* (2013.01)
USPC .......... 715/779; 715/773; 715/759; 715/810; 715/963; 715/967; 715/968
(58) Field of Classification Search
CPC .... G06F 3/0481; G06F 3/0485; G06F 3/0486
USPC ........................................ 715/779
See application file for complete search history.

(56) References Cited

U.S. PATENT DOCUMENTS

| 4,823,283 A | 4/1989 | Diehm et al. ............ 715/825 |
| 5,155,806 A | 10/1992 | Hoeber et al. ............ 715/711 |

(Continued)

FOREIGN PATENT DOCUMENTS

| AU | 2005203411 | 3/2006 |
| AU | 2007255043 | 8/2012 |

(Continued)

OTHER PUBLICATIONS

Russel et al., (hereinafter "Russel"), "Special Edition Using Microsoft® Office Outlook® 2003," Que publishing, published on Sep. 25, 2003.*

(Continued)

*Primary Examiner* — Linh K Pham
(74) *Attorney, Agent, or Firm* — Thomas Wong; Jim Ross; Micky Minhas

(57) ABSTRACT

An electronic "To-Do" bar is provided in which displayed upcoming tasks, meetings, appointments and the like. The electronic To-Do bar is displayed in a lightweight menu of tasks, meetings and appointments and is displayed persistently in addition to other software functionality or user interfaces displayed on a user's computer display screen according to other software applications or other software functionality in use. A user is presented with an always-visible list of upcoming tasks, meetings and appointments without the need to launch a separate tasks application or calendar application to view upcoming tasks, meetings or appointments.

24 Claims, 5 Drawing Sheets

(56) References Cited

U.S. PATENT DOCUMENTS

| | | | |
|---|---|---|---|
| 5,220,675 A | 6/1993 | Padawer et al. | |
| 5,247,438 A | 9/1993 | Subas et al. | 700/90 |
| 5,305,435 A | 4/1994 | Bronson | |
| 5,323,314 A | 6/1994 | Baber et al. | 705/8 |
| 5,377,354 A | 12/1994 | Scannell et al. | 718/103 |
| 5,412,772 A | 5/1995 | Monson | |
| 5,457,476 A * | 10/1995 | Jenson | 715/823 |
| 5,461,708 A | 10/1995 | Kahn | |
| 5,500,936 A | 3/1996 | Allen et al. | 395/156 |
| 5,502,805 A | 3/1996 | Anderson et al. | |
| 5,519,606 A | 5/1996 | Frid-Nielsen et al. | 705/9 |
| 5,559,875 A | 9/1996 | Bieselin et al. | 379/202.01 |
| 5,559,944 A | 9/1996 | Ono | 715/841 |
| 5,570,109 A * | 10/1996 | Jenson | 715/823 |
| 5,581,677 A | 12/1996 | Myers et al. | |
| 5,588,107 A | 12/1996 | Bowden et al. | 715/828 |
| 5,592,602 A | 1/1997 | Edmunds | |
| 5,596,694 A | 1/1997 | Capps | 345/473 |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,638,504 A | 6/1997 | Scott et al. | 715/202 |
| 5,644,737 A | 7/1997 | Tuniman et al. | 715/810 |
| 5,659,693 A | 8/1997 | Hansen et al. | 715/779 |
| 5,664,127 A | 9/1997 | Anderson et al. | 715/209 |
| 5,664,208 A | 9/1997 | Pavley et al. | 715/209 |
| 5,673,403 A | 9/1997 | Brown et al. | 715/744 |
| 5,721,847 A | 2/1998 | Johnson | 715/786 |
| 5,734,915 A | 3/1998 | Roewer | 395/773 |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,764,960 A | 6/1998 | Perks et al. | |
| 5,778,402 A | 7/1998 | Gipson | 715/201 |
| 5,778,404 A | 7/1998 | Capps et al. | 715/531 |
| 5,787,295 A | 7/1998 | Nakao | 715/210 |
| 5,793,365 A | 8/1998 | Tang et al. | 715/758 |
| 5,796,393 A | 8/1998 | MacNaughton et al. | |
| 5,805,167 A | 9/1998 | Van Cruyningen | 715/808 |
| 5,812,132 A | 9/1998 | Goldstein | 715/797 |
| 5,821,936 A | 10/1998 | Shaffer et al. | 715/810 |
| 5,828,376 A | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A * | 12/1998 | Huemoeller et al. | 705/5 |
| 5,864,848 A * | 1/1999 | Horvitz et al. | 1/1 |
| 5,872,973 A | 2/1999 | Mitchell et al. | |
| 5,873,108 A | 2/1999 | Goyal et al. | 715/203 |
| 5,874,956 A | 2/1999 | Webster et al. | |
| 5,885,006 A | 3/1999 | Sheedy | 384/192 |
| 5,893,073 A | 4/1999 | Kasso et al. | 705/8 |
| 5,893,125 A | 4/1999 | Shostak | 715/206 |
| 5,898,436 A | 4/1999 | Stewart et al. | 345/354 |
| 5,899,979 A * | 5/1999 | Miller et al. | 705/7.21 |
| 5,905,863 A | 5/1999 | Knowles et al. | 709/206 |
| 5,924,089 A | 7/1999 | Mocek et al. | |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,078 A | 8/1999 | Nagarajayya et al. | 345/346 |
| 5,940,847 A | 8/1999 | Fein et al. | 707/540 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,173 A | 12/1999 | Ubillos | |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,395 A | 3/2000 | Chow et al. | |
| 6,038,542 A | 3/2000 | Ruckdashel | 705/9 |
| 6,043,816 A | 3/2000 | Williams et al. | |
| 6,067,087 A | 5/2000 | Krauss et al. | 715/762 |
| 6,067,551 A | 5/2000 | Brown et al. | 1/1 |
| 6,072,492 A | 6/2000 | Schagen et al. | 715/733 |
| 6,073,110 A * | 6/2000 | Rhodes et al. | 705/7.12 |
| 6,073,142 A | 6/2000 | Geiger et al. | |
| 6,085,206 A | 7/2000 | Domini et al. | 707/533 |
| 6,088,707 A | 7/2000 | Bates et al. | |
| 6,101,480 A | 8/2000 | Conmy et al. | 705/9 |
| 6,133,915 A | 10/2000 | Arcuri et al. | 715/779 |
| 6,154,755 A | 11/2000 | Dellert et al. | |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 715/210 |
| 6,195,094 B1 | 2/2001 | Celebiler | 715/764 |
| 6,199,102 B1 | 3/2001 | Cobb | |
| 6,211,879 B1 | 4/2001 | Soohoo | 715/854 |
| 6,216,122 B1 | 4/2001 | Elson | 707/5 |
| 6,219,670 B1 | 4/2001 | Mocek et al. | 707/102 |
| 6,222,540 B1 | 4/2001 | Sacerdoti | 345/581 |
| 6,232,971 B1 | 5/2001 | Haynes | 715/800 |
| 6,236,396 B1 | 5/2001 | Jenson et al. | 715/764 |
| 6,237,135 B1 | 5/2001 | Timbol | |
| 6,239,798 B1 | 5/2001 | Ludolph et al. | |
| 6,256,628 B1 | 7/2001 | Dobson et al. | 707/6 |
| 6,269,341 B1 | 7/2001 | Redcay, Jr. | 705/8 |
| 6,272,488 B1 | 8/2001 | Chang et al. | |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,307,574 B1 | 10/2001 | Ashe | |
| 6,311,195 B1 | 10/2001 | Hachiya et al. | |
| 6,313,854 B1 * | 11/2001 | Gibson | 715/788 |
| 6,323,883 B1 | 11/2001 | Minoura et al. | 715/784 |
| 6,326,962 B1 | 12/2001 | Szabo | 715/762 |
| 6,327,046 B1 | 12/2001 | Miyamoto et al. | 358/1.15 |
| 6,341,277 B1 | 1/2002 | Coden et al. | 707/718 |
| 6,342,901 B1 | 1/2002 | Adler et al. | |
| 6,353,451 B1 | 3/2002 | Teibel et al. | 715/803 |
| 6,356,893 B1 | 3/2002 | Itakura et al. | |
| 6,359,634 B1 | 3/2002 | Cragun et al. | 715/777 |
| 6,373,507 B1 | 4/2002 | Camara et al. | 345/825 |
| 6,374,304 B1 | 4/2002 | Chiashi | |
| 6,384,849 B1 | 5/2002 | Morcos et al. | 715/810 |
| 6,385,769 B1 | 5/2002 | Lewallen | |
| 6,405,216 B1 | 6/2002 | Minnaert et al. | 707/104.1 |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | 707/694 |
| 6,433,801 B1 | 8/2002 | Moon et al. | 345/840 |
| 6,433,831 B1 | 8/2002 | Dinwiddie et al. | 348/553 |
| 6,434,598 B1 | 8/2002 | Gish | 709/203 |
| 6,442,527 B1 | 8/2002 | Worthington | 705/8 |
| 6,446,118 B1 | 9/2002 | Gottlieb | |
| 6,456,304 B1 | 9/2002 | Angiulo et al. | 345/779 |
| 6,457,062 B1 | 9/2002 | Pivowar et al. | 709/248 |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kineo et al. | 345/837 |
| 6,469,723 B1 | 10/2002 | Gould | |
| 6,480,865 B1 | 11/2002 | Lee et al. | 715/523 |
| 6,484,180 B1 | 11/2002 | Lyons et al. | 1/1 |
| 6,493,006 B1 | 12/2002 | Gourdol et al. | 715/825 |
| 6,493,007 B1 | 12/2002 | Pang | |
| 6,493,731 B1 | 12/2002 | Jones et al. | 715/234 |
| 6,507,845 B1 | 1/2003 | Cohen et al. | 707/608 |
| 6,546,417 B1 | 4/2003 | Baker | 709/206 |
| 6,567,509 B1 | 5/2003 | Gusler et al. | |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,584,501 B1 | 6/2003 | Cartsonis et al. | |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,633,867 B1 | 10/2003 | Kraft et al. | |
| 6,635,089 B1 | 10/2003 | Burkett et al. | 715/513 |
| 6,654,791 B1 | 11/2003 | Bates et al. | |
| 6,664,983 B2 | 12/2003 | Ludolph | 715/775 |

(56) References Cited

U.S. PATENT DOCUMENTS

| | | | |
|---|---|---|---|
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/234 |
| 6,701,513 B1 | 3/2004 | Bailey | |
| 6,707,454 B1 | 3/2004 | Barg | |
| 6,708,205 B2 | 3/2004 | Sheldon et al. | 709/206 |
| 6,721,402 B2 | 4/2004 | Usami | |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,850 B2 | 6/2004 | O'Leary | |
| 6,750,890 B1 | 6/2004 | Sugimoto | 715/838 |
| 6,785,868 B1 | 8/2004 | Raff | 715/530 |
| 6,789,107 B1 | 9/2004 | Bates et al. | |
| 6,799,095 B1 | 9/2004 | Owen et al. | |
| 6,816,904 B1 | 11/2004 | Ludwig et al. | |
| 6,825,859 B1 | 11/2004 | Severenuk et al. | 345/764 |
| 6,826,729 B1 | 11/2004 | Giesen et al. | 715/837 |
| 6,850,255 B2 | 2/2005 | Muschetto | 715/788 |
| 6,871,195 B2 | 3/2005 | Ryan et al. | 706/46 |
| 6,882,353 B2 | 4/2005 | Nettles et al. | |
| 6,882,354 B2 | 4/2005 | Nielson | 715/784 |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,907,423 B2 | 6/2005 | Weil et al. | |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | 709/206 |
| 6,928,613 B1 | 8/2005 | Ishii | |
| 6,934,740 B1 | 8/2005 | Lawande et al. | |
| 6,941,304 B2 | 9/2005 | Gainey et al. | |
| 6,956,429 B1 | 10/2005 | Elbanhawy | |
| 6,964,025 B2 | 11/2005 | Angiulo | 715/838 |
| 6,981,209 B1 | 12/2005 | Parikh et al. | |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 6,990,652 B1 | 1/2006 | Parthasarathy et al. | |
| 6,990,654 B2 | 1/2006 | Carroll, Jr. | |
| 7,027,463 B2 | 4/2006 | Mathew et al. | |
| 7,032,210 B2 | 4/2006 | Alloing et al. | |
| 7,039,596 B1 | 5/2006 | Lu | 705/8 |
| 7,046,848 B1 | 5/2006 | Olcott | 382/176 |
| 7,069,538 B1 | 6/2006 | Renshaw | |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,117,370 B2 | 10/2006 | Khan et al. | 713/186 |
| 7,134,095 B1 | 11/2006 | Smith et al. | |
| 7,149,983 B1 | 12/2006 | Robertson et al. | 715/810 |
| 7,152,207 B1 | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,188,317 B1 | 3/2007 | Hazel | 715/804 |
| 7,206,813 B2 | 4/2007 | Dunbar et al. | |
| 7,206,814 B2 | 4/2007 | Kirsch | |
| 7,212,208 B2 | 5/2007 | Khozai | 345/440 |
| 7,216,301 B2 | 5/2007 | Moehrle | 715/811 |
| 7,219,305 B2 | 5/2007 | Jennings | 715/761 |
| 7,240,323 B1 | 7/2007 | Desai et al. | 717/100 |
| 7,249,325 B1 | 7/2007 | Donaldson | 715/777 |
| 7,263,668 B1 | 8/2007 | Lentz | 715/801 |
| 7,290,033 B1 | 10/2007 | Goldman et al. | 709/206 |
| 7,296,241 B2 | 11/2007 | Oshiro et al. | |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,356,772 B2 | 4/2008 | Brownholtz et al. | 715/752 |
| 7,360,174 B2 | 4/2008 | Grossman et al. | 715/854 |
| 7,370,282 B2 * | 5/2008 | Cary | 715/772 |
| 7,386,535 B1 | 6/2008 | Kalucha et al. | |
| 7,386,835 B1 | 6/2008 | Desai et al. | 717/117 |
| 7,392,249 B1 | 6/2008 | Harris et al. | 707/5 |
| 7,395,221 B2 | 7/2008 | Doss et al. | 705/9 |
| 7,395,500 B2 | 7/2008 | Whittle et al. | |
| 7,421,660 B2 | 9/2008 | Charmock et al. | 715/751 |
| 7,421,690 B2 | 9/2008 | Forstall et al. | 709/206 |
| 7,426,713 B2 | 9/2008 | Duggan et al. | |
| 7,461,077 B1 | 12/2008 | Greenwood | |
| 7,464,343 B2 | 12/2008 | Shaw et al. | |
| 7,469,385 B2 | 12/2008 | Harper et al. | |
| 7,472,117 B2 | 12/2008 | Dettinger et al. | 1/1 |
| 7,484,213 B2 | 1/2009 | Mathew et al. | |
| 7,499,907 B2 | 3/2009 | Brown et al. | 1/1 |
| 7,505,954 B2 | 3/2009 | Heidloff et al. | 707/1 |
| 7,530,029 B2 | 5/2009 | Satterfield et al. | 715/779 |
| 7,555,707 B1 | 6/2009 | Labarge et al. | 715/234 |
| 7,567,964 B2 | 7/2009 | Brice et al. | 707/9 |
| 7,584,253 B2 * | 9/2009 | Curbow et al. | 709/206 |
| 7,627,561 B2 | 12/2009 | Pell et al. | 707/3 |
| 7,664,821 B1 | 2/2010 | Ancin et al. | 709/206 |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 7,788,598 B2 | 8/2010 | Bansal et al. | 715/810 |
| 7,802,199 B2 | 9/2010 | Shneerson et al. | |
| 7,831,902 B2 | 11/2010 | Sourov et al. | 715/220 |
| 7,853,877 B2 | 12/2010 | Giesen et al. | 715/711 |
| 7,865,868 B2 | 1/2011 | Falzone Schaw et al. | |
| 7,870,465 B2 | 1/2011 | VerSteeg | 714/774 |
| 7,886,290 B2 | 2/2011 | Dhanjal et al. | 717/170 |
| 7,895,531 B2 | 2/2011 | Radtke et al. | 715/810 |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 8,239,882 B2 | 8/2012 | Dhanjal et al. | |
| 8,255,828 B2 | 8/2012 | Harris et al. | |
| 8,402,096 B2 | 3/2013 | Affronti et al. | |
| 8,484,578 B2 | 7/2013 | Gordner et al. | |
| 8,605,090 B2 | 12/2013 | Garg et al. | |
| 8,267,562 B2 | 1/2014 | Hartwell et al. | |
| 8,638,333 B2 | 1/2014 | Garg et al. | |
| 8,689,137 B2 | 4/2014 | McCormack et al. | |
| 8,762,880 B2 | 6/2014 | Dukhon et al. | |
| 2001/0032220 A1 | 10/2001 | Van Hoff | 707/513 |
| 2001/0034762 A1 | 10/2001 | Jacobs et al. | |
| 2001/0035882 A1 | 11/2001 | Stoakley et al. | 715/779 |
| 2001/0040627 A1 | 11/2001 | Obradovich | |
| 2001/0044736 A1 | 11/2001 | Jacobs et al. | |
| 2001/0044741 A1 | 11/2001 | Jacobs et al. | |
| 2001/0049677 A1 | 12/2001 | Talib et al. | 707/3 |
| 2002/0007380 A1 | 1/2002 | Bauchot et al. | 707/530 |
| 2002/0029247 A1 | 3/2002 | Kawamoto | 709/206 |
| 2002/0037754 A1 | 3/2002 | Hama et al. | 455/566 |
| 2002/0052721 A1 | 5/2002 | Ruff et al. | 703/1 |
| 2002/0052880 A1 | 5/2002 | Fruensgaard et al. | 707/104.1 |
| 2002/0052916 A1 | 5/2002 | Kloba et al. | |
| 2002/0054101 A1 | 5/2002 | Beatty | |
| 2002/0054128 A1 | 5/2002 | Lau et al. | |
| 2002/0070977 A1 | 6/2002 | Morcos et al. | 345/810 |
| 2002/0073156 A1 | 6/2002 | Newman | |
| 2002/0075330 A1 | 6/2002 | Rosenzweig et al. | 345/854 |
| 2002/0078143 A1 | 6/2002 | DeBoor et al. | 709/203 |
| 2002/0083054 A1 | 6/2002 | Peltonen et al. | 707/5 |
| 2002/0089543 A1 | 7/2002 | Ostergaard et al. | |
| 2002/0091697 A1 | 7/2002 | Huang et al. | 707/10 |
| 2002/0091739 A1 | 7/2002 | Ferlitsch | 707/526 |
| 2002/0097266 A1 | 7/2002 | Hachiya et al. | |
| 2002/0099775 A1 | 7/2002 | Gupta et al. | |
| 2002/0116508 A1 | 8/2002 | Khan et al. | |
| 2002/0122071 A1 | 9/2002 | Camara et al. | 715/810 |
| 2002/0123984 A1 | 9/2002 | Prakash | |
| 2002/0129052 A1 | 9/2002 | Glazer et al. | |
| 2002/0133557 A1 | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | 715/810 |

(56) References Cited

U.S. PATENT DOCUMENTS

| | | | |
|---|---|---|---|
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0158876 A1 | 10/2002 | Janssen | 345/504 |
| 2002/0163538 A1 | 11/2002 | Shteyn | 345/752 |
| 2002/0175938 A1 | 11/2002 | Hackworth | 345/751 |
| 2002/0175955 A1 | 11/2002 | Gourdol et al. | 345/821 |
| 2002/0186257 A1 | 12/2002 | Cadiz et al. | 715/764 |
| 2002/0188515 A1 | 12/2002 | Nakata et al. | |
| 2002/0196293 A1 | 12/2002 | Suppan et al. | 345/853 |
| 2003/0005051 A1 | 1/2003 | Gottlieb | |
| 2003/0005056 A1 | 1/2003 | Yamamoto et al. | |
| 2003/0009455 A1 | 1/2003 | Carlson et al. | 707/6 |
| 2003/0011564 A1 | 1/2003 | Ushino et al. | |
| 2003/0011638 A1 | 1/2003 | Chung | 345/808 |
| 2003/0011639 A1 | 1/2003 | Webb | 715/808 |
| 2003/0014421 A1 | 1/2003 | Jung | 707/102 |
| 2003/0014490 A1 | 1/2003 | Bates et al. | 709/206 |
| 2003/0016248 A1 | 1/2003 | Hayes Ubillos | |
| 2003/0022700 A1 | 1/2003 | Wang | 455/566 |
| 2003/0025732 A1 | 2/2003 | Prichard | 345/765 |
| 2003/0025737 A1 | 2/2003 | Breinberg | |
| 2003/0028560 A1 | 2/2003 | Kudrolli et al. | |
| 2003/0035917 A1 | 2/2003 | Hyman | 428/67 |
| 2003/0038832 A1 | 2/2003 | Sobol | 715/722 |
| 2003/0043200 A1 | 3/2003 | Faieta et al. | 345/804 |
| 2003/0043211 A1 | 3/2003 | Kremer et al. | 715/838 |
| 2003/0046528 A1 | 3/2003 | Haitani et al. | 713/2 |
| 2003/0050986 A1 | 3/2003 | Matthews et al. | |
| 2003/0066025 A1 | 4/2003 | Garner et al. | 715/500 |
| 2003/0069892 A1 | 4/2003 | Hind et al. | |
| 2003/0069900 A1 | 4/2003 | Hind et al. | |
| 2003/0070143 A1 | 4/2003 | Maslov | 715/513 |
| 2003/0084035 A1 | 5/2003 | Emerick | 707/3 |
| 2003/0093490 A1 | 5/2003 | Yamamoto et al. | 709/213 |
| 2003/0097361 A1* | 5/2003 | Huang et al. | 707/10 |
| 2003/0097640 A1 | 5/2003 | Abrams et al. | 715/530 |
| 2003/0098891 A1 | 5/2003 | Molander | 715/841 |
| 2003/0106024 A1 | 6/2003 | Silverbrook et al. | 715/515 |
| 2003/0110191 A1 | 6/2003 | Handsaker et al. | 707/503 |
| 2003/0112278 A1 | 6/2003 | Driskell | 715/788 |
| 2003/0132972 A1 | 7/2003 | Pang | |
| 2003/0135825 A1 | 7/2003 | Gertner et al. | 715/513 |
| 2003/0154254 A1 | 8/2003 | Awasthi | |
| 2003/0156140 A1 | 8/2003 | Watanabe | 345/810 |
| 2003/0160821 A1 | 8/2003 | Yoon | 345/762 |
| 2003/0163455 A1 | 8/2003 | Dettinger et al. | 707/3 |
| 2003/0163537 A1 | 8/2003 | Rohall et al. | 709/206 |
| 2003/0167310 A1 | 9/2003 | Moody et al. | 709/206 |
| 2003/0169284 A1 | 9/2003 | Dettinger et al. | 715/708 |
| 2003/0177190 A1 | 9/2003 | Moody et al. | |
| 2003/0187586 A1 | 10/2003 | Katzenmaier et al. | |
| 2003/0195937 A1 | 10/2003 | Kircher et al. | 709/207 |
| 2003/0200267 A1 | 10/2003 | Garrigues | |
| 2003/0206646 A1 | 11/2003 | Brackett | 382/128 |
| 2003/0218611 A1 | 11/2003 | Ben-Tovim et al. | 345/440 |
| 2003/0220138 A1 | 11/2003 | Walker et al. | |
| 2003/0226106 A1 | 12/2003 | McKellar et al. | 715/513 |
| 2003/0227487 A1 | 12/2003 | Hugh | 715/777 |
| 2003/0229668 A1 | 12/2003 | Malik | |
| 2003/0229673 A1 | 12/2003 | Malik | |
| 2003/0233419 A1 | 12/2003 | Beringer | 709/206 |
| 2004/0002941 A1 | 1/2004 | Thorne et al. | |
| 2004/0003351 A1 | 1/2004 | Sommerer et al. | 715/251 |
| 2004/0006570 A1 | 1/2004 | Gelb et al. | 707/102 |
| 2004/0010513 A1* | 1/2004 | Scherr et al. | 707/104.1 |
| 2004/0012633 A1 | 1/2004 | Helt | 715/764 |
| 2004/0021647 A1 | 2/2004 | Iwema et al. | |
| 2004/0024824 A1 | 2/2004 | Ferguson et al. | |
| 2004/0030993 A1 | 2/2004 | Hong Huey et al. | |
| 2004/0056894 A1 | 3/2004 | Zaika et al. | 345/762 |
| 2004/0073503 A1 | 4/2004 | Morales et al. | |
| 2004/0083432 A1 | 4/2004 | Kawamura et al. | 715/526 |
| 2004/0088359 A1 | 5/2004 | Simpson | |
| 2004/0090315 A1 | 5/2004 | Mackjust et al. | 340/426.13 |
| 2004/0093290 A1 | 5/2004 | Doss et al. | |
| 2004/0100504 A1 | 5/2004 | Sommer | 345/810 |
| 2004/0100505 A1 | 5/2004 | Cazier | 345/811 |
| 2004/0107197 A1 | 6/2004 | Shen et al. | 707/9 |
| 2004/0109025 A1 | 6/2004 | Hullot et al. | 345/764 |
| 2004/0109033 A1 | 6/2004 | Vienneau et al. | 345/863 |
| 2004/0117451 A1 | 6/2004 | Chung | 709/207 |
| 2004/0119755 A1 | 6/2004 | Guibourge | |
| 2004/0119760 A1 | 6/2004 | Grossman et al. | 715/854 |
| 2004/0122789 A1 | 6/2004 | Ostertag et al. | |
| 2004/0125142 A1 | 7/2004 | Mock et al. | 345/765 |
| 2004/0128275 A1 | 7/2004 | Moehrle | 707/1 |
| 2004/0133854 A1 | 7/2004 | Black | 715/517 |
| 2004/0135811 A1 | 7/2004 | Pickering et al. | |
| 2004/0142720 A1 | 7/2004 | Smethers | 455/550.1 |
| 2004/0153968 A1 | 8/2004 | Ching et al. | 715/513 |
| 2004/0164983 A1 | 8/2004 | Khozai | 345/440 |
| 2004/0168153 A1 | 8/2004 | Marvin | 717/120 |
| 2004/0186775 A1 | 9/2004 | Margiloff et al. | 705/14 |
| 2004/0189694 A1 | 9/2004 | Kurtz et al. | |
| 2004/0192440 A1 | 9/2004 | Evans et al. | |
| 2004/0205536 A1 | 10/2004 | Newman et al. | |
| 2004/0212640 A1 | 10/2004 | Mann | |
| 2004/0215612 A1 | 10/2004 | Brody | 707/3 |
| 2004/0221234 A1 | 11/2004 | Imai | 715/256 |
| 2004/0230508 A1 | 11/2004 | Minnis et al. | 705/35 |
| 2004/0230906 A1 | 11/2004 | Pik et al. | 715/522 |
| 2004/0236796 A1 | 11/2004 | Bhatt et al. | |
| 2004/0239700 A1 | 12/2004 | Baschy | 715/781 |
| 2004/0243938 A1 | 12/2004 | Weise et al. | 715/205 |
| 2004/0260756 A1 | 12/2004 | Forstall et al. | |
| 2004/0261013 A1* | 12/2004 | Wynn et al. | 715/511 |
| 2004/0268231 A1 | 12/2004 | Tunning | 715/513 |
| 2004/0268235 A1 | 12/2004 | Wason | |
| 2004/0268270 A1 | 12/2004 | Hill et al. | 715/963 |
| 2005/0004989 A1 | 1/2005 | Satterfield et al. | 709/206 |
| 2005/0004990 A1 | 1/2005 | Durazo et al. | 709/206 |
| 2005/0005235 A1 | 1/2005 | Satterfield et al. | 715/519 |
| 2005/0005249 A1* | 1/2005 | Hill et al. | 715/963 |
| 2005/0010871 A1 | 1/2005 | Ruthfield et al. | 715/712 |
| 2005/0015361 A1 | 1/2005 | Payton et al. | |
| 2005/0021504 A1 | 1/2005 | Atchison | 707/3 |
| 2005/0021521 A1 | 1/2005 | Wycoff | |
| 2005/0022116 A1 | 1/2005 | Bowman et al. | 715/513 |
| 2005/0033614 A1 | 2/2005 | Lettovsky et al. | 705/5 |
| 2005/0039142 A1 | 2/2005 | Jalon et al. | 715/823 |
| 2005/0043015 A1 | 2/2005 | Muramatsu | 455/412.1 |
| 2005/0044500 A1 | 2/2005 | Orimoto et al. | 715/706 |
| 2005/0055449 A1 | 3/2005 | Rappold, III | 709/228 |
| 2005/0057584 A1 | 3/2005 | Gruen et al. | 715/752 |
| 2005/0060337 A1 | 3/2005 | Chou et al. | |
| 2005/0086135 A1 | 4/2005 | Lu | 705/30 |
| 2005/0091576 A1 | 4/2005 | Relyea et al. | |
| 2005/0097465 A1 | 5/2005 | Giesen et al. | 715/700 |
| 2005/0108348 A1 | 5/2005 | Lee | |
| 2005/0114778 A1 | 5/2005 | Branson et al. | 715/711 |
| 2005/0117179 A1 | 6/2005 | Ito et al. | 358/1.15 |
| 2005/0132010 A1 | 6/2005 | Muller | |
| 2005/0132053 A1 | 6/2005 | Roth et al. | 709/227 |
| 2005/0138576 A1 | 6/2005 | Baumert et al. | 715/862 |
| 2005/0144241 A1 | 6/2005 | Stata et al. | |
| 2005/0144284 A1 | 6/2005 | Ludwig et al. | 709/226 |
| 2005/0144560 A1 | 6/2005 | Gruen et al. | |
| 2005/0144568 A1 | 6/2005 | Gruen et al. | 715/822 |
| 2005/0172262 A1 | 8/2005 | Lalwani | 717/109 |
| 2005/0177789 A1 | 8/2005 | Abbar et al. | 705/528 |
| 2005/0183008 A1 | 8/2005 | Crider et al. | 715/517 |
| 2005/0185920 A1 | 8/2005 | Harper et al. | |
| 2005/0203975 A1 | 9/2005 | Jindal et al. | 707/204 |
| 2005/0216863 A1 | 9/2005 | Schumacher et al. | 715/827 |
| 2005/0223057 A1 | 10/2005 | Buccheit et al. | |
| 2005/0223066 A1 | 10/2005 | Buchheit et al. | |
| 2005/0223329 A1 | 10/2005 | Schwartz et al. | 715/711 |
| 2005/0234910 A1 | 10/2005 | Buchheit et al. | |
| 2005/0240902 A1 | 10/2005 | Bunker et al. | |
| 2005/0251757 A1 | 11/2005 | Farn | |
| 2005/0256867 A1 | 11/2005 | Walther et al. | 707/5 |
| 2005/0278656 A1 | 12/2005 | Goldthwaite et al. | 715/810 |
| 2005/0289109 A1 | 12/2005 | Arrouye et al. | 707/1 |

(56) References Cited

U.S. PATENT DOCUMENTS

| | | | |
|---|---|---|---|
| 2005/0289156 A1 | 12/2005 | Maryka et al. | 707/100 |
| 2005/0289159 A1 | 12/2005 | Weiss et al. | 707/100 |
| 2006/0015816 A1 | 1/2006 | Kuehner et al. | 715/744 |
| 2006/0020962 A1 | 1/2006 | Stark | 725/32 |
| 2006/0026033 A1 | 2/2006 | Brydon et al. | 705/1 |
| 2006/0026145 A1 | 2/2006 | Beringer et al. | |
| 2006/0026213 A1 | 2/2006 | Yaskin et al. | 707/200 |
| 2006/0026242 A1 | 2/2006 | Kuhlmann et al. | |
| 2006/0036580 A1 | 2/2006 | Stata | 707/3 |
| 2006/0036945 A1 | 2/2006 | Radtke et al. | 715/708 |
| 2006/0036946 A1 | 2/2006 | Radtke et al. | 715/711 |
| 2006/0036950 A1 | 2/2006 | Himberger et al. | 715/732 |
| 2006/0036964 A1 | 2/2006 | Satterfield et al. | 715/777 |
| 2006/0036965 A1 | 2/2006 | Harris et al. | 715/777 |
| 2006/0041545 A1 | 2/2006 | Heidloff et al. | 707/4 |
| 2006/0047644 A1 | 3/2006 | Bocking et al. | |
| 2006/0053383 A1 | 3/2006 | Gauthier et al. | |
| 2006/0064434 A1 | 3/2006 | Gilbert et al. | 707/104.1 |
| 2006/0069604 A1 | 3/2006 | Leukart et al. | 705/9 |
| 2006/0069686 A1 | 3/2006 | Beyda et al. | 707/10 |
| 2006/0074844 A1 | 4/2006 | Frankel et al. | |
| 2006/0080303 A1 | 4/2006 | Sargent et al. | 707/3 |
| 2006/0085502 A1 | 4/2006 | Sundararajan et al. | |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117249 A1 | 6/2006 | Hu et al. | 715/255 |
| 2006/0117302 A1 | 6/2006 | Mercer et al. | 717/131 |
| 2006/0129937 A1 | 6/2006 | Shafron | 715/733 |
| 2006/0132812 A1 | 6/2006 | Barnes et al. | 358/1.11 |
| 2006/0155689 A1 | 7/2006 | Blakeley et al. | 707/3 |
| 2006/0161849 A1 | 7/2006 | Miller et al. | 715/744 |
| 2006/0161863 A1 | 7/2006 | Gallo | 715/810 |
| 2006/0168522 A1 | 7/2006 | Bala | |
| 2006/0173824 A1 | 8/2006 | Bensky | 707/3 |
| 2006/0173961 A1 | 8/2006 | Turski et al. | |
| 2006/0200455 A1 | 9/2006 | Wilson | |
| 2006/0218500 A1 | 9/2006 | Sauve et al. | 715/767 |
| 2006/0242557 A1 | 10/2006 | Nortis, III | 715/234 |
| 2006/0242575 A1 | 10/2006 | Winser | 715/530 |
| 2006/0248012 A1 | 11/2006 | Kircher et al. | 705/50 |
| 2006/0259449 A1 | 11/2006 | Betz et al. | 707/1 |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294452 A1 | 12/2006 | Matsumoto | 715/236 |
| 2006/0294526 A1 | 12/2006 | Hambrick et al. | 719/315 |
| 2007/0006206 A1 | 1/2007 | Dhanjal et al. | 717/168 |
| 2007/0011258 A1 | 1/2007 | Koo | |
| 2007/0033250 A1 | 2/2007 | Levin et al. | |
| 2007/0050182 A1 | 3/2007 | Sneddon et al. | 704/2 |
| 2007/0050401 A1 | 3/2007 | Young et al. | 707/102 |
| 2007/0055936 A1 | 3/2007 | Dhanjal et al. | |
| 2007/0055943 A1 | 3/2007 | McCormack et al. | 715/746 |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0061738 A1 | 3/2007 | Taboada et al. | |
| 2007/0094230 A1 | 4/2007 | Subramaniam et al. | |
| 2007/0106951 A1 | 5/2007 | McCormack et al. | 715/764 |
| 2007/0124696 A1 | 5/2007 | Mullender | |
| 2007/0143662 A1 | 6/2007 | Carlson et al. | 715/507 |
| 2007/0143671 A1 | 6/2007 | Paterson et al. | 715/209 |
| 2007/0180040 A1 | 8/2007 | Etgen et al. | 709/207 |
| 2007/0185826 A1 | 8/2007 | Brice et al. | 707/1 |
| 2007/0203991 A1 | 8/2007 | Fisher et al. | |
| 2007/0240057 A1 | 10/2007 | Satterfield et al. | 715/705 |
| 2007/0260996 A1 | 11/2007 | Jakobson | 715/781 |
| 2007/0266017 A1 | 11/2007 | Held et al. | |
| 2007/0279417 A1 | 12/2007 | Garg et al. | 345/440 |
| 2007/0282956 A1 | 12/2007 | Staats | 709/206 |
| 2007/0300168 A1 | 12/2007 | Bosma et al. | 715/820 |
| 2008/0005274 A1 | 1/2008 | Khoo | |
| 2008/0005686 A1 | 1/2008 | Singh | |
| 2008/0034304 A1 | 2/2008 | Feuerbacher et al. | 715/764 |
| 2008/0040682 A1 | 2/2008 | Sorenson et al. | 715/777 |
| 2008/0052670 A1 | 2/2008 | Espinosa et al. | |
| 2008/0077571 A1 | 3/2008 | Harris et al. | 707/5 |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | 717/105 |
| 2008/0141242 A1 | 6/2008 | Shapiro | 717/174 |
| 2008/0155555 A1 | 6/2008 | Kwong | 719/315 |
| 2008/0168146 A1 | 7/2008 | Fletcher | |
| 2008/0178110 A1 | 7/2008 | Hill et al. | 715/771 |
| 2008/0244440 A1 | 10/2008 | Bailey | |
| 2009/0007003 A1 | 1/2009 | Dukhon et al. | 715/778 |
| 2009/0012984 A1 | 1/2009 | Ravid et al. | 707/101 |
| 2009/0083656 A1 | 3/2009 | Dukhon et al. | 715/781 |
| 2009/0100009 A1 | 4/2009 | Karp | |
| 2009/0106375 A1 | 4/2009 | Carmel et al. | 709/206 |
| 2009/0144651 A1 | 6/2009 | Sprang et al. | |
| 2009/0152349 A1 | 6/2009 | Bonev et al. | |
| 2009/0158173 A1 | 6/2009 | Palahnuk et al. | |
| 2009/0192845 A1 | 7/2009 | Gudipaty et al. | |
| 2009/0217192 A1 | 8/2009 | Dean et al. | 715/777 |
| 2009/0222763 A1 | 9/2009 | Dukhon et al. | 715/808 |
| 2009/0319619 A1 | 12/2009 | Affronti | |
| 2009/0319911 A1 | 12/2009 | McCann | |
| 2010/0011310 A1 | 1/2010 | Rainisto | |
| 2010/0060645 A1 | 3/2010 | Garg et al. | 345/440 |
| 2010/0159967 A1* | 6/2010 | Pounds et al. | 455/466 |
| 2010/0180226 A1 | 7/2010 | Satterfield et al. | 715/777 |
| 2010/0191818 A1 | 7/2010 | Satterfield et al. | 709/206 |
| 2010/0199261 A1 | 8/2010 | Shenfield et al. | |
| 2010/0211889 A1 | 8/2010 | Durazo et al. | 715/752 |
| 2010/0293470 A1 | 11/2010 | Zhao et al. | |
| 2011/0072396 A1 | 3/2011 | Giesen et al. | 715/841 |
| 2011/0138273 A1 | 6/2011 | Radtke et al. | 715/256 |
| 2011/0225249 A1 | 9/2011 | Forstall et al. | |
| 2011/0296322 A1 | 12/2011 | Dhanjal et al. | 715/760 |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |
| 2013/0159879 A1 | 6/2013 | Affronti et al. | |
| 2013/0283207 A1 | 10/2013 | Dukhon et al. | |
| 2014/0115526 A1 | 4/2014 | Hartwell et al. | |
| 2014/0132609 A1 | 5/2014 | Garg et al. | |

FOREIGN PATENT DOCUMENTS

| | | |
|---|---|---|
| CN | 1746914 | 3/2006 |
| CN | 101243439 | 6/2012 |
| CN | 102067166 | 6/2013 |
| CN | 102317897 | 7/2013 |
| CN | 102077163 | 10/2013 |
| EP | 0 910 007 | 4/1999 |
| EP | 1 077 405 A2 | 2/2001 |
| EP | 1 104 151 | 5/2001 |
| EP | 1 672 518 | 6/2001 |
| EP | 1 223 503 | 7/2002 |
| EP | 1 376 337 | 2/2004 |
| EP | 1 462 999 A2 | 9/2004 |
| EP | 1 542 133 A2 | 6/2005 |
| EP | 1 564 652 | 8/2005 |
| EP | 1 628 197 | 2/2006 |
| EP | 1 628 198 | 2/2006 |
| EP | 1 628 199 | 2/2006 |
| EP | 1 645 972 | 4/2006 |
| EP | 1 835 434 A1 | 9/2007 |
| EP | 1 915 001 | 4/2008 |
| GB | 2329813 | 3/1999 |
| GB | 2 391 148 | 1/2004 |
| ID | P 0027717 | 3/2011 |
| ID | P 0027754 | 3/2011 |
| ID | P 0029297 | 10/2011 |
| JP | 03-043824 | 2/1991 |
| JP | 04-186425 | 3/1992 |
| JP | 04-312186 | 11/1992 |
| JP | 05-204579 | 8/1993 |
| JP | 06-052282 | 2/1994 |
| JP | 06-342357 | 12/1994 |

(56) References Cited

FOREIGN PATENT DOCUMENTS

| | | |
|---|---|---|
| JP | 09-204289 | 8/1997 |
| JP | 10-074217 | 3/1998 |
| JP | 10-326171 | 12/1998 |
| JP | 11-039292 | 2/1999 |
| JP | 11-175258 | 7/1999 |
| JP | 11-259200 | 9/1999 |
| JP | 2001-034775 | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-526820 | 9/2003 |
| JP | 2003-308145 | 10/2003 |
| JP | 2004-078512 | 3/2004 ............. G06F 17/30 |
| JP | 2004-086893 | 3/2004 |
| JP | 2004-102803 | 4/2004 ............. G06F 17/30 |
| JP | 2004-512578 | 4/2004 |
| JP | 2004-145569 | 5/2004 ............. G06F 17/21 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-025550 | 1/2005 |
| JP | 2005-31995 | 2/2005 |
| JP | 2005-032041 | 2/2005 |
| JP | 2005-182353 | 7/2005 ............. G06F 17/30 |
| JP | 2005-352849 | 12/2005 |
| JP | 2006-059358 | 3/2006 |
| JP | 2007-280180 | 10/2007 |
| JP | 2007-531165 | 11/2007 |
| JP | 2008-047067 | 2/2008 |
| JP | 2009-507311 | 2/2009 |
| JP | 2005-236089 | 9/2011 |
| JP | 4832024 | 9/2011 |
| JP | 5021185 | 6/2012 |
| JP | 5079701 | 9/2012 |
| JP | 5139984 | 11/2012 |
| JP | 5190452 | 2/2013 |
| JP | 5193042 | 2/2013 |
| JP | 5221757 | 3/2013 |
| JP | 5266384 | 5/2013 |
| JP | 5559817 | 6/2014 |
| JP | 5559845 | 6/2014 |
| KR | 10-2003-0070685 | 2/2003 |
| KR | 10-2005-0023805 A | 3/2005 |
| KR | 10-2005-0036702 A | 4/2005 |
| KR | 10-1130421 | 3/2012 |
| KR | 10-1149960 | 5/2012 |
| KR | 10-1149990 | 5/2012 |
| KR | 10-1159334 | 6/2012 |
| KR | 10-1238559 | 2/2013 |
| KR | 10-1298338 | 8/2013 |
| KR | 10-1298461 | 8/2013 |
| KR | 10-1312867 | 9/2013 |
| KR | 10-1323011 | 10/2013 |
| MY | 147334 | 7/2013 |
| MY | 149803 | 10/2013 |
| PE | 1 628 198 | 2/2006 |
| PH | 1-2005-000404 | 8/2011 |
| PH | 1-2005-000495 | 3/2014 |
| RU | 2001-122576 A | 9/2003 |
| RU | 2005-116667 | 11/2006 |
| RU | 2005-120362 | 1/2007 |
| RU | 2005-130357 | 4/2007 |
| RU | 2322687 | 4/2008 |
| RU | 2328034 | 6/2008 |
| TW | 460839 | 10/2001 |
| TW | 490652 | 6/2002 |
| TW | 2003-05097 | 10/2003 |
| TW | 2008-14632 | 3/2008 |
| TW | I389002 | 3/2013 |
| TW | I389043 | 3/2013 |
| TW | I401577 | 7/2013 |
| WO | 92/21091 | 11/1992 |
| WO | 94-20921 | 9/1994 |
| WO | 96/10231 | 4/1996 |
| WO | 96-39654 | 12/1996 |
| WO | 98/20410 | 5/1998 |
| WO | WO 99/04353 A1 | 1/1999 ............. G06F 17/60 |
| WO | WO 99/27495 | 6/1999 |
| WO | WO 01/55894 | 8/2001 |
| WO | WO 02/091162 A3 | 11/2002 |
| WO | WO 03/003240 A2 | 1/2003 |
| WO | WO 03/098500 | 11/2003 |
| WO | WO 2007/033159 A1 | 3/2007 |
| WO | WO 2007/027737 A1 | 8/2007 |
| WO | 2008/027477 | 3/2008 |
| WO | WO 2008/121718 A1 | 9/2008 |
| WO | 2009-158151 | 12/2009 |
| WO | 2009-158171 | 12/2009 |
| WO | 2009-158172 | 12/2009 |

OTHER PUBLICATIONS

Ramamritham et al., Scheduling Algorithms and Operating Systems Support for Real-Time Systems; © 1994; IEEE; 13 pages.*

Zweben et al., Scheduling and Rescheduling with Iterative Repair, © 1993; IEEE; 9 pages.*

Aoyagi, Hideo, "Mail Mac Fan Special 33"; Manichi Communications Inc., Mar. 1, 2004, 5 pgs.

Morita, Utako; "Literature Searching System, 'JDream'"; Online Search; vol. 23, No. 4; The Society of Japan Terminal, Dec. 2002; 5 pgs.

Milstein, Sarah; "The Missing Manual: The book that should have been in the box", First Edition; O'Reilly Japan, Inc.; Nov. 25, 2004; 1 pg.

Cole; "New Arrival! Forefront of Downloading"; Mac People; vol. 11, No. 10; ASCII Corporation; Aug. 31, 2005; 1 pg.

Sada, Morihiro; "Clue for Managing Common Data Filed on Server"; Business Personal Computer Age; vol. 15, No. 7; Dempa Publications, Inc.; Jul. 1, 1997; 1 pg.

Japanese Notice of Rejection dated Nov. 25, 2011 cited in Appln. No. 2008-531249.

Korean Notice of Rejection dated Jan. 30, 2012 cited in Appln No. 10-2004-0048176.

Japanese Notice of Rejection dated Feb. 3, 2012 cited in Appln No. 2008-530218.

U.S. Official Action dated Jan. 26, 2012 in U.S. Appl. No. 12/464,584.

U.S. Appl. No. 13/027,289, filed Feb. 15, 2011 entitled "Floating Command Object".

Adler, "Emerging Standards for Component Software," Cybersquare, 1995 IEEE, 10 pgs.

Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].

Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.

"Create Office add-ins: ribbons, toolbars, taskpanes, menus etc.", http://www.add-in-express.com/creating-addins-blog/feed/.

"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.

"What's New in Excel 2007", Feb. 26, 2007.

Whitechapel et al., "Microsoft Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in.

Notice on Reexamination dated Jan. 21, 2011 cited in Appln No. 200510089514.X.

(56) References Cited

OTHER PUBLICATIONS

Chinese Third Office Action dated Feb. 10, 2011 cited in Appln No. 200680033212.3.
U.S. Official Action dated Feb. 11, 2011 in U.S. Appl. No. 11/401,470.
Malaysian Substantive Examination Adverse Report dated Jan. 31, 2012 cited in Appln No. PI 20053258.
Malaysian Substantive Examination Adverse Report dated Jan. 31, 2012 cited in Appln No. PI 20053259.
European Search Report dated Feb. 10, 2012 cited in Appln No. 05107153.8.
European Search Report dated Feb. 15, 2012 cited in Appln No. 05107157.9.
European Search Report dated Feb. 28, 2012 cited in Appln No. 05107184.3.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
European Search Report dated Mar. 16, 2012 cited in Appln No. 05107186.6.
Taiwan Notice of Allowance dated Mar. 29, 2012 cited in Appln No. 10120306600.
Douglas et al., "Dynamic Popup Menu Titles"; IP.Com Journal, ip.com Inc., West Henrietta, NY, Aug. 1, 1992, 2 pgs.
Haden et al.; "Scrollable Popup Menu with Selection Tracking Display of Graphical Objects"; IP.Com Journal, ip.com Inc., West Henrietta, NY, Aug. 1, 1994, 6 pgs.
"Index Card Metaphor for Multiple Property Sheets Associated with A Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
U.S. Official Action dated Feb. 27, 2012 in U.S. Appl. No. 12/372,386.
U.S. Official Action dated Mar. 14, 2012 in U.S. Appl. No. 12/142,927.
U.S. Appl. No. 13/437,031, filed Apr. 2, 2012 entitled "Automatic Grouping of Electronic Mail".
U.S. Appl. No. 13/427,939, filed Mar. 23, 2012 entitled "An Improved User Interface for Displaying a Gallery of Formatting Options Applicable to a Selected Object".
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
PCT Written Opinion and Search Report dated Nov. 29, 2010 cited in International Application No. PCT/US2010/034277.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Philippines Examiner's Action dated Apr. 12, 2011 cited in Appln No. 1-2005-00404.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.

Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Chinese Decision on Reexamination dated Feb. 1, 2012 cited in Appln No. 200510089514.X.
Taiwan Office Action dated Feb. 8, 2012 cited in Appln No. 94123640, with Eng Lang Summary.
Taiwan Search Report dated Mar. 14, 2012 cited in Appln No. 094123420.
Chilean Office Action dated Mar. 29, 2012 cited in Appln No. 1560-2010, w/English Language Summary.
Chilean Office Action dated Mar. 29, 2012 cited in Appln No. 1559-2010, w/English Language Summary.
India First Examination Report dated Mar. 30, 2012 cited in Appln No. 1817/DEL/2005.
Japanese Notice of Allowance dated Apr. 11, 2012 cited in Appln No. 2008-530229.
Chinese Fourth Office Action dated Apr. 27, 2012 cited in Appln No. 200680018095.3.
U.S. Official Action dated Apr. 5, 2012 in U.S. Appl. No. 12/163,758.
U.S. Official Action dated Apr. 19, 2012 in U.S. Appl. No. 13/102,633.
U.S. Official Action dated Apr. 26, 2012 in U.S. Appl. No. 11/782,059.
U.S. Appl. No. 13/102,633, filed May 6, 2011 entitled "Markup Based Extensibility for User Interfaces".
Japanese Notice of Rejection dated May 6, 2011 cited in Appln. No. 2005-236089.
Japanese Notice of Rejection dated May 6, 2011 cited in Appln. No. 2005-236087.
Chinese Second Office Action dated May 19, 2011 cited in Appln No. 200780020312.7.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
U.S. Appl. No. 12/163,758, filed Jun. 27, 2008 entitled "Communication Between a Document Editor-in-Space User Interface and a Document Editor Out-Space User Interface".
U.S. Appl. No. 12/163,784, filed Jun. 27, 2008 entitled "Exposing Non-Authoring Features Through Document Status Information in an Out-Space User Interface".
U.S. Appl. No. 11/445,393, filed Jun. 1, 2006 entitled "Modifying a Chart".
U.S. Appl. No. 12/028,797, filed Feb. 11, 2008 entitled "Side-by-Side Shared Calendars".
U.S. Appl. No. 12/574,256, filed Oct. 6, 2009 entitled "Modifying a Chart".
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
U.S. Appl. No. 12/769,787, filed Apr. 29, 2010 entitled "Conversation Grouping of Electronic Mail Records".
U.S. Appl. No. 11/217,071, filed Aug. 30, 2005 entitled "Markup Based Extensibility for User Interfaces".
Microsoft Press, Microsoft Computer Dictionary, Microsoft Press, Fifth Edition, 2002, pp. 374, 382.
Screendumps—Microsoft Office (Microsoft Corporation, Microsoft Office Professional Edition 2003; 16 pages).
Clifton, The Application Automation layer—Using XML to Dynamically Generale GUI Elements—forms and controls, The Code Project, Jun. 2003, pp. 1-37.
ScreenShot of MS_Office_2003; (Microsoft Corporation, Microsoft Office Professional Edition 2003; 6 pages).
PCT Written Opinion and Search Report dated Jan. 9, 2007 cited in International Application No. PCT/US2006/033809.

(56) References Cited

OTHER PUBLICATIONS

European Office Action mailed Mar. 9, 2009, cited in Appln No. 06790087.8.
Russian Office Action dated Oct. 26, 2009 cited in Appln No. 2005120363/09(023023).
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Russian Office Action dated Dec. 28, 2009 cited in Appln No. 2005125836/09(029010).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
Australian Office Action dated May 28, 2010 cited in Appln No. 2005202717.
U.S. Official Action dated Jun. 21, 2007 in U.S. Appl. No. 10/955,928.
U.S. Official Action dated May 28, 2008 in U.S. Appl. No. 10/982,073.
U.S. Official Action dated Jun. 20, 2008 in U.S. Appl. No. 10/955,928.
U.S. Official Action dated Sep. 15, 2009 in U.S. Appl. No. 11/217,071.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
Halvorson et al., Microsoft Office Professional Official Manual, Aug. 20, 2002, 10 pgs.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
The Discussion Board Component of Blackboard: An Instructor's Guide; Aug. 2004; 23 pgs.
Hock, "Yahoo! To the Max"; May 10, 2005; 5 excerpted pgs.
Homeworking Forum; archived Dec. 6, 2004; 11 pgs.
Gina Danielle Venolia et al., Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002,8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs, Feb. 29, 2008.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs, Feb. 29, 2008.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Australian OA dated Jan. 17, 2011 cited in Application No. 2006287408.
Chinese Second Office Action dated Apr. 7, 2011 cited in Application No. 200680032789.2, w/translation.
Japanese Office Action dated Jun. 10, 2011 cited in JP Application No. 2008-530229, w/translation.
Chinese Second Office Action dated Jul. 14, 2011 cited in Appln No. 20680018095.3.
Chinese Decision on Rejection dated Jul. 21, 2011 cited in Appln No. 20068032789.2.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Aug. 3, 2011 in U.S. Appl. No. 12/142,927.
Ohmori, Yasuo et al., "Eigyo Mind—A Sales Support Tool," PFU Tech. Rev., vol. 10, No. 1, pp. 32-38, PFU Limited, May 1, 1999.
Mexican Office Action dated May 26, 2011 cited in Appln. No. MX/a/2009/004151.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Sep. 13, 2011 in U.S. Appl. No. 12/372,386.

(56) References Cited

OTHER PUBLICATIONS

U.S. Official Action dated Sep. 14, 2011 in U.S. Appl. No. 12/163,758.
Mexican Office Action dated May 4, 2010 cited in Appln No. 2005/008354.
U.S. Official Action dated Sep. 21, 2010 in U.S. Appl. No. 11/217,071.
U.S. Official Action dated Sep. 27, 2010 in U.S. Appl. No. 10/836,154.
U.S. Appl. No. 12/954,952, filed Sep. 29, 2010 entitled "Gallery User Interface Controls".
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
European Search Report dated Nov. 25, 2008 cited in Application EP 06 79 0087.
Israeli Office Action dated Jul. 5, 2010 cited in Appln No. 169718.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
Israeli Office Action dated Oct. 28, 2010 cited in Appln No. 169716.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
Dr. Dobb's Journal; "Windows 95 Common Controls"; May 1, 1995; 12 pgs.
Mexican Office Action Summary, dated Sep. 22, 2011 cited in Appln. No. MX/A/2008/003342.
Japanese Notice of Rejection dated Nov. 4, 2011 cited in Appln No. 2008-513476.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.
U.S. Appl. No. 11/154,278, filed Jun. 16, 2005 entitled "Cross Version and Cross Product User Interface Compatibility".
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/607,020, filed Jun. 26, 2003 entitled "Side-by-Side Shared Calendars".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/848,774, filed May 19, 2004 entitled "Automatic Grouping of Electronic Mail".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".
U.S. Appl. No. 10/955,942, filed Sep. 30, 2004 entitled "An Improved User Interface for Displaying a Gallery of Formatting Options Applicable to a Selected Object".
U.S. Appl. No. 10/800,056, filed Mar. 12, 2004 entitled "Method and System for Data Binding in a Block Structured User Interface Scripting Language".
U.S. Appl. No. 12/372,386, filed Feb. 17, 2009 entitled "Command User Interface For Displaying Multiple Sections of Software Functionality Controls".
U.S. Appl. No. 11/430,561, filed May 9, 2006 entitled "Integrated Search and Find User Interface".
U.S. Appl. No. 11/430,562, filed May 9, 2006 entitled "Expanded Search and Find User Interface".
U.S. Appl. No. 11/430,416, filed May 9, 2006 entitled "Search and Find Using Expanded Search Scope".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.

(56) References Cited

OTHER PUBLICATIONS

"Primary Windows," http://www-03.ibm.com/servers/eserver/iseries/navigator/guidelines/primary.html, 23 pgs, Feb. 23, 2007.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 5 pp.
Becker et al., "Virtual Folders: Database Support for Electronic Messages Classification," Pontificia Universidade Catolica do Rio Grande do Sul, Porto Alegre, Brazil, pp. 163-170, 2010.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, Que Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
"Convert to Word 2007," http://www.regencytraining.com/word-2007-conversion.html, *Regency Training and Consulting*, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).
Krill, P., "Microsoft's Ribbon Interface Draws Frowns, Smiles," *InfoWorld*, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].

(56) References Cited

OTHER PUBLICATIONS

Perronne et al. "Building Java Enterprise Systems with J2EE", Publisher: Sams, Pub Date: Jun. 7, 2000 (pp. 1-8).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, pp. 374, 382, 2002.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.x1.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0,1895,1771841,00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Danish Written Opinion Appl. No. SG 200504508-3 dated Sep. 18, 2006.
Danish Search Report Appl. No. SG 200504475-5 dated Sep. 19, 2006.
NZ Application No. 541301, Examination Report dated Jul. 25, 2005.
NZ Application No. 541300, Examination Report dated Jul. 25, 2005.
NZ Application No. 541299, Examination Report dated Jul. 25, 2005.
Australian Search Report dated Jan. 16, 2007 cited in Singapore Application No. 200504474-8.
PCT Search Report dated Feb. 6, 2007 cited in International Application No. PCT/US2006/035467.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
International Search Report dated Oct. 17, 2007 cited in International Application No. PCT/US2006/012724.
International Search Report dated Nov. 27, 2007 in PCT/US2007/012573, 9 pages.
Chinese First Office Action dated Mar. 21, 2008 cited in Appln No. 200510092146.4.
Chinese First Office Action dated Mar. 21, 2008 cited in Appln No. 200510092139.4.
Chinese First Office Action dated Apr. 11, 2008 cited in Appln No. 200510092141.1.
Chinese First Office Action dated Apr. 18, 2008 cited in Appln No. 200510092142.6.
Philippines Examiner's Action dated Apr. 21, 2008 cited in Appln No. 1-2005-000405.
Philippines Examiner's Action dated Apr. 21, 2008 cited in Appln No. 1-2005-000406.
Chilean Office Action dated Mar. 28, 2008 cited in Appln No. 1770-05, no English Translation.
Chinese First Office Action dated May 23, 2008 cited in Appln No. 200510089514.X.
European Summons to Attend Oral Proceedings dated Jun. 23, 2008 cited in Appln No. 04102463.9.
Philippines Examiner's Action dated Jul. 31, 2008 cited in Appln No. 12005000495.
Philippines Examiner's Action dated Aug. 19, 2008 cited in Appln No. 12005000405.
Philippines Examiner's Action dated Sep. 12, 2008 cited in Appln No. 1200500406.
Chinese Second Office Action dated Oct. 10, 2008 cited in Appln No. 200510092141.1.
Chinese Second Office Action dated Oct. 17, 2008 cited in Appln No. 200510092139.4.
Chinese Second Office Action dated Nov. 21, 2008 cited in Appln No. 200510089514.X.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chilean Second Office Action dated Mar. 4, 2009 cited in Appln No. 2512-2005.
Chinese Office Action dated Apr. 3, 2009 cited in Appln No. 200510089514.X.
Supplementary European Search Report dated Jun. 9, 2009 cited in EP Application No. 07795391.7-1225.
Mexican Office Action dated Jun. 19, 2009 cited in Appln. No. PA/a/2005/007073.
Chinese Third Office Action dated Jun. 19, 2009 cited in Appln No. 200510092139.4.
Russian Office Action dated Jun. 24, 2009 cited in Appln No. 2005120363/28(023023).
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
Israeli Office Action dated Sep. 6, 2009 cited in Appln No. 169716.
Israeli Office Action dated Sep. 7, 2009 cited in Appln No. 169718.
European Search Report dated Sep. 7, 2009 cited in EP Application No. 09006972.5-2211.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 14, 2009 cited in Appln. No. 07795391.7-1225.
European Communication dated Sep. 28, 2009 cited in Appln No. 09006972.5-2211.
Chinese Office Action dated Oct. 16, 2009 cited in Appln No. 200510092142.6.
Chilean Second Office Action dated Dec. 4, 2009 cited in Appln No. 1768-2005.
PCT Search Report and Written Opinion dated Dec. 29, 2009 cited in International Application No. PCT/US2009/046344.
U.S. Official Action dated Dec. 23, 2003 in U.S. Appl. No. 09/896,384.
U.S. Official Action dated Apr. 27, 2006 in U.S. Appl. No. 10/800,056.
U.S. Final Official Action dated Oct. 19, 2006 in U.S. Appl. No. 10/800,056.
U.S. Official Action dated Apr. 12, 2007 in U.S. Appl. No. 10/851,506.
U.S. Official Action dated Jun. 4, 2007 in U.S. Appl. No. 10/955,940.
U.S. Official Action dated Jul. 26, 2006 in U.S. Appl. No. 10/741,407.
U.S. Final Official Action dated Jan. 23, 2007 in U.S. Appl. No. 10/741,407.
U.S. Official Action dated Jan. 4, 2007 in U.S. Appl. No. 10/607,020.
U.S. Official Action dated Jun. 14, 2007 in U.S. Appl. No. 10/836,154.
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 11, 2007 in U.S. Appl. No. 10/955,942.
U.S. Official Action dated Jul. 13, 2007 in U.S. Appl. No. 10/800,056.

(56) References Cited

OTHER PUBLICATIONS

U.S. Official Action dated Sep. 6, 2007 in U.S. Appl. No. 11/136,800.
U.S. Official Action dated Sep. 26, 2007 in U.S. Appl. No. 11/151,686.
U.S. Official Action dated Oct. 9, 2007 in U.S. Appl. No. 10/982,073.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.
U.S. Official Action dated Jan. 28, 2008 in U.S. Appl. No. 10/836,154.
U.S. Official Action dated Feb. 20, 2008 in U.S. Appl. No. 10/848,774.
U.S. Official Action dated Feb. 21, 2008 in U.S. Appl. No. 10/851,442.
U.S. Official Action dated Feb. 22, 2008 in U.S. Appl. No. 11/445,393.
U.S. Official Action dated Apr. 15, 2008 in U.S. Appl. No. 10/955,942.
U.S. Official Action dated Apr. 16, 2008 in U.S. Appl. No. 10/955,967.
U.S. Official Action dated Apr. 29, 2008 in U.S. Appl. No. 10/955,941.
U.S. Official Action dated May 30, 2008 in U.S. Appl. No. 11/430,562.
U.S. Official Action dated Jun. 19, 2008 in U.S. Appl. No. 10/851,506.
U.S. Official Action dated Jun. 27, 2008 in U.S. Appl. No. 11/430,416.
U.S. Official Action dated Jul. 9, 2008 in U.S. Appl. No. 11/136,800.
U.S. Official Action dated Jul. 17, 2008 in U.S. Appl. No. 10/955,940.
U.S. Official Action dated Jul. 24, 2008 in U.S. Appl. No. 11/151,686.
U.S. Official Action dated Oct. 8, 2008 in U.S. Appl. No. 11/445,393.
U.S. Official Action dated Oct. 28, 2008 in U.S. Appl. No. 11/151,686.
U.S. Official Acton dated Nov. 13, 2008 in U.S. Appl. No. 11/430,562.
U.S. Official Action dated Nov. 25, 2008 in U.S. Appl. No. 11/154,278.
U.S. Official Action dated Dec. 11, 2008 in U.S. Appl. No. 10/982,073.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Jan. 9, 2009 in U.S. Appl. No. 11/430,561.
U.S. Official Action dated Mar. 18, 2009 in U.S. Appl. No. 11/401,470.
U.S. Official Action dated Apr. 7, 2009 in U.S. Appl. No. 10/955,940.
U.S. Official Action dated Apr. 28, 2009 in U.S. Appl. No. 12/028,797.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Acton dated Jun. 19, 2009 in U.S. Appl. No. 11/430,562.
U.S. Official Action dated Jun. 24, 2009 in U.S. Appl. No. 10/607,020.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Sep. 23, 2009 in U.S. Appl. No. 11/401,470.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
Seo et al, "Hangul Office 2000 Tutoring Book", Sep. 15, 2000, 16 pgs.
Office 2007, Microsoft, Released on Nov. 6, 2006, 23 pgs.
Mexican Office Action dated Jan. 6, 2011 cited in Appln No. PA/a/2005/008354.
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Korean Notice of Rejection dated May 17, 2011 cited in Appln No. 10-2004-48176.
Russian Office Action dated Jun. 14, 2011 cited in Appln No. 2008147090.
Chinese Third Office Action dated Jun. 21, 2011 cited in Appln No. 200680030421.2.
U.S. Official Action dated Jun. 9, 2011 in U.S. Appl. No. 12/464,584.
U.S. Official Action dated Jul. 8, 2011 in U.S. Appl. No. 11/401,470.
U.S. Official Action dated Jul. 8, 2011 in U.S. Appl. No. 12/163,784.
Korean Notice of Rejection dated Nov. 3, 2011 cited in Appln No. 10-2005-0067257.
Japanese Notice of Rejection dated Nov. 11, 2011 cited in Appln No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
U.S. Appl. No. 13/615,668, filed Sep. 14, 2012 entitled "User Interface for Dispalying Selectable Software Functionality Controls that are Relevant to a Selected Object".
EP Communication dated Sep. 26, 2012 cited in Appln No. PCT/US2006/034993.
U.S. Official Action dated Sep. 11, 2012 in U.S. Appl. No. 12/163,784.
U.S. Official Action dated Sep. 13, 2012 in U.S. Appl. No. 13/437,031.
U.S. Official Action dated Jun. 19, 2012 in U.S. Appl. No. 12/769,787.
Chinese Office Action dated Jul. 12, 2012 in Appln No. 201080008789.5.
Chinese Decision on Rejection dated Jul. 31, 2012 cited in Appln No. 200680018095.3.
Chinese Office Action dated Aug. 2, 2012 in Appln No. 200980124945.1.
U.S. Appl. No. 13/595,084, filed Aug. 27, 2012 entitled "Command User Interface for Displaying Selectable Software Functionality Controls".
U.S. Official Action dated Aug. 7, 2012 in U.S. Appl. No. 10/836,154.
U.S. Appl. No. 13/464,572, filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224.
U.S. Official Action dated May 8, 2012 in U.S. Appl. No. 12/144,642.
Microsoft Office 2007 Word Help, 3 pgs.

(56) References Cited

OTHER PUBLICATIONS

Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Canadian Office Action dated Nov. 29, 2012 cited in Appln No. 2,512,036.
Russian Office Action dated Dec. 12, 2012 cited in Appln No. 2010140069.
Chinese Second Office Action dated Dec. 17, 2012 cited in Appln No. 200980124644.9.
Chinese Third Office Action dated Dec. 31, 2012 in Appln No. 200980124944.7.
Chinese Second Office Action dated Dec. 31, 2012 in Appln No. 200980124945.1.
Chinese Second Office Action dated Jan. 4, 2013 in Appln No. 201080008789.5.
Chinese Office Action dated Jan. 6, 2013 in Appln No. 201080021957.4.
EP Communication dated Jan. 10, 2013 cited in Appln No. PCT/US2010/021888.
Canadian Office Action dated Jan. 18, 2013 in Appln No. 2,512,155.
U.S. Official Action dated Dec. 12, 2012 in U.S. Appl. No. 10/851,506.
U.S. Official Action dated Dec. 12, 2012 in U.S. Appl. No. 12/954,952.
U.S. Official Action dated Dec. 31, 2012 in U.S. Appl. No. 12/142,927.
Philippines Substantive Examination Report dated Apr. 25, 2013 cited in Appln No. 1-2005-000495.
EP Search Report dated May 10, 2013 cited in Appln No. PCT/US2009/044292.
Mexican Office Action dated May 23, 2013 in Appln No. MX/a/2008/003342.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
Korean Notice of Preliminary Rejection dated Nov. 12, 2012 cited in KR-10-2008-7005939.
Chilean Second Office Action dated Nov. 21, 2012 cited in Appln No. 1559-2010.
Canadian Office Action dated Nov. 23, 2012 cited in Appln No. 2,512,102.
Canadian Office Action dated Nov. 29, 2012 cited in Appln No. 2,512,047.
U.S. Official Action dated Oct. 24, 2012 in U.S. Appl. No. 13/102,633.
U.S. Official Action dated Nov. 23, 2012 in U.S. Appl. No. 11/782,059.
Redmond, Tony; Excerpt from Book; Microsoft Exchange Server 2003; Published 2003; 14 pgs. (provided to M&G Aug. 9, 2012 by Microsoft).
Miser, "Special Edition Using Mac OS X v10.2"; Pub. Date Jan. 3, 2003; Que; Spe. Ed.; pp. 272-275.
Mod et al., "Design and Development of Multidevice User Interfaces through Multiple Logical Descriptions"; Aug. 2004; vol. 30; 14 pgs.
Mexican Office Action dated Feb. 3, 2012 cited in Appln No. MX/A/2008/002889 with summary.
Israeli Office Action dated Feb. 23, 2012 cited in Appln No. 170668.
Israeli Office Action dated May 3, 2012 cited in Appln No. 169718.
Taiwan Office Action dated May 14, 2012 cited in Appln No. 94122180, with Eng Lang Summary.
Israeli Office Action dated Jun. 3, 2012 cited in Appln No. 189293.
Chinese Second Office Action dated Jun. 18, 2012 in Appln No. 200910148820.4.
Chinese Office Action dated Jul. 2, 2012 in Appln No. 200980124944.7.
Israeli Office Action dated Aug. 29, 2012 in Appln No. 169717.
Malaysian Substantive Examination Report dated Oct. 31, 2012 cited in Appln No. PI 20053260, 2 pgs.
Canadian Office Action dated Nov. 29, 2012 cited in Appln No. 2,511,101 3 pgs.
Korean Notice of Rejection dated Feb. 22, 2013 in Appln No. 10-2008-7005078 13 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Chinese Fourth Office Action dated Apr. 23, 2013 cited in Appln No. 200980124944.7, 7 pgs.
EP Search Report dated Apr. 18, 2013 in Appln No. PCT/US2006/012724, 12 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Official Action dated Apr. 29, 2013 in U.S. Appl. No. 12/954,952, 18 pgs.
U.S. Appl. No. 13/769,598, filed Feb. 18, 2013 entitled "Automatic Conversation Techniques".
Malaysia Substantive Examination Adverse Report dated Jan. 15, 2013 in Appln No. PI 20084401, 3 pgs.
EP Search Report dated Jan. 30, 2013 in Appln No. PCT/US2009/044059, 8 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
Mexican Office Action dated Feb. 25, 2013 in Appln No. MX/a/2008/002889, 11 pgs.
U.S. Official Action dated Mar. 1, 2013 in U.S. Appl. No. 11/430,562, 66 pgs.
Russian Office Action dated May 13, 2013 cited in Appln No. 2010-151922.
Korean Final Notice of Preliminary Rejection dated May 20, 2013 cited in Appln No. 10-2008-7005939.
Chinese Notice on Third Office Action dated Jun. 5, 2013 cited in Appln No. 200980124644.9.
Mexican Office Action dated Jun. 11, 2013 in Appln No. PA/a/2005/008351.
Mexican Office Action dated Jun. 20, 2013 in Appln No. MX/a/2010-014056.
EP Communication dated Jul. 17, 2013 in Appln No. EP 07 795 391.7.
U.S. Official Action dated Jun. 3, 2013 in U.S. Appl. No. 13/102,622, 29 pgs.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
Israeli Office Action dated Oct. 17, 2013 cited in Appln No. 1611334.
India First Examination Report dated Oct. 21, 2013 cited in Appln No. 1017/DEL/2004.
Korean Notice of Preliminary Rejection dated Nov. 7, 2013 cited in KR-10-2008-7029272.
Canadian Office Action dated Nov. 15, 2013 in Appln No. 2,512,102.
Chinese Third Office Action dated Dec. 4, 2013 in Appln No. 200680032789.2.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.

(56) References Cited

OTHER PUBLICATIONS

U.S. Official Action dated Nov. 29, 2013 in U.S. Appl. No. 12/144,642, 73 pgs.
U.S. Official Action dated Dec. 6, 2013 in U.S. Appl. No. 10/851,506, 25 pgs.
Israeli Office Action dated Jun. 18, 2013 cited in Appln No. 170668.
Chinese Second Office Action dated Aug. 5, 2013 in Appln No. 201080021957.4.
Russian Decision on Grant dated Aug. 12, 2013 in Appln No. 2010151922/08.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Appl. No. 14/032,094, filed Sep. 19, 2013 entitled "User Interface for Displaying Selectable Software Functionality Controls that are Relevant to a Selected Object", Satterfield et al.
Canadian Office Action dated Sep. 18, 2013 in Appln No. 2,512,036.
Japanese Notice of Rejection dated Sep. 19, 2013 in Appln No. 2012-153634.
Mexican Office Action dated Sep. 27, 2013 in Appln No. MX/a/2008/014849.
EP Communications to Attend Oral Proceedings dated Oct. 4, 2013 in Appln No. 09 006 972.5.
Canadian Office Action dated Oct. 7, 2013 in Appln No. 2,650,016.
Chilean Third Office Action dated Oct. 9, 2013 in Appln No. 2512-2005.
Mexican Office Action dated Oct. 28, 2013 cited in Appln. No. MX/a/2010/013566.
Canadian Office Action dated Oct. 30, 2013 in Appln No. 2,512,047.
Mexican Office Action dated Oct. 3, 2011 cited in Appln. No. MX/a/2008/014849.
U.S. Official Action dated Oct. 25, 2011 in U.S. Appl. No. 12/144,642.
U.S. Official Action dated Nov. 2, 2011 cited in U.S. Appl. No. 10/836,154.
U.S. Appl. No. 13/925,523, filed Jun. 24, 2013 entitled "Communication Between a Document Editor-in-Space User Interface and a Document Editor Out-Space User Interface", Dukhon et al.
U.S. Appl. No. 14/142,132, filed Dec. 27, 2013 entitled "Expanded Search and Find User Interface".
U.S. Appl. No. 14/150,531, filed Jan. 8, 2014 entitled "Modifying and Formatting a Chart Using Pictorially Provided Chart Elements".
U.S. Appl. No. 14/226,421, filed Mar. 24, 2014 entitled "Exposing Non-Authoring Features Through Document Status Information in an Out-Space User Interface".
Inoue; "Let's Learn PowerPoint Using Actual Samples"; Nikkei PC21, Japan, Nikkei Business Publications, Inc., Apr. 1, 2008, vol. 13, No. 7, 5 pgs.—No English Translation.
Mexican Office Action dated Jan. 22, 2013 cited in Appln No. MX/a/2008/003342.
Mexican Office Action dated Mar. 22, 2013 in Appln No. PA/a/2005/008350.
Mexican Office Action dated Jun. 11, 2013 cited in Appln. No. MX/a/2008/003342.
Mexican Office Action dated Jul. 9, 2013 in Appln No. MX/a/2008/002889, 13 pgs.
Mexican Office Action dated Aug. 20, 2013 in Appln No. MX/a/2011/011749, 10 pgs.
Canadian Office Action dated Dec. 5, 2013 in Appln No. 2,618,169.
Japanese Office Action dated Jan. 9, 2014 cited in JP Application No. 2012-510906 w/translation, 4 pgs.
Chinese Decision on Rejection dated Jan. 13, 2014 in Appln No. 200980124644.9.
Malaysian Substantive Examination Report dated Jan. 15, 2014 in Appln No. PI 20080508, 3 pgs.

EP Communication dated Jan. 27, 2014 in Appln No. 09 767 2208, 7 pgs.
Canadian Office Action dated Jan. 28, 2014 in Appln No. 2,511,101, 4 pgs.
Norway Office Action dated Feb. 10, 2014 in Appln No. 20053655, 4 pgs.
Norway Office Action dated Feb. 10, 2014 in Appln No. 20053658, 4 pgs.
EP Communication dated Feb. 11, 2014 cited in Appln No. 09 798 374.6, 6 pgs.
Mexican Office Action dated Feb. 11, 2014 cited in Appln No. MX/a/2008/003342, 8 pgs.
EP Communication on Decision to Refuse dated Feb. 20, 2014 cited in Appln No. 09 006 972.5, 15 pgs.
Australian Office Action dated Feb. 28, 2014 in Appln No. 2009262834, 3 pgs.
Australian Office Action dated Feb. 28, 2014 in Appln No. 2009262833, 3 pgs.
Australian Office Action dated Mar. 4, 2014 in Appln No. 2009260596, 4 pgs.
Australian Office Action dated Mar. 4, 2014 in Appln No. 2009271517, 3 pgs.
Taiwan Office Action dated Mar. 17, 2014 in Appln. No. 98118252, 10 pgs.
India First Examination Report dated Mar. 19, 2014 in Appln No. 1818/DEL/2005, 1 pg.
Chilean Office Action dated Mar. 30, 2014 in Appln No. 2804-2011, 7 pgs.
Chinese Third Office Action dated Apr. 3, 2014 in Appln No. 201080021957.4, 6 pgs.
Canadian Office Action dated Apr. 25, 2014 in Appln No. 2,512,155, 9 pgs.
U.S. Official Action dated Jan. 16, 2014 in U.S. Appl. No. 13/102,633, 45 pgs.
U.S. Official Action dated Feb. 4, 2014 in U.S. Appl. No. 10/607,020, 149 pgs.
U.S. Official Action dated Feb. 26, 2014 in U.S. Appl. No. 12/954,952, 38 pgs.
U.S. Official Action dated Mar. 3, 2014 in U.S. Appl. No. 11/332,822, 38 pgs.
U.S. Official Action dated Mar. 4, 2014 in U.S. Appl. No. 12/142,927, 45 pgs.
U.S. Official Action dated Apr. 18, 2014 in U.S. Appl. No. 11/782,059, 42 pgs.
U.S. Official Action dated Apr. 24, 2014 in U.S. Appl. No. 12/028,797, 42 pgs.
Australian Second Office Action dated Apr. 29, 2014 in Appln No. 2009271517, 3 pgs.
Philippines Substantive Examination Report dated Apr. 30, 2014 cited in Appln No. 1-2008-500356, 1 pg.
Australian Office Action dated Apr. 30 2014 in Appln No. 2010247882, 3 pgs.
EP Search Report dated Jun. 2, 2014 in Appln No. PCT/US2010/034277, 6 pgs.
U.S. Official Action dated May 14, 2014 in U.S. Appl. No. 13/615,668, 34 pgs.
U.S. Official Action dated May 30 2014 in U.S. Appl. No. 13/027,289, 188 pgs.
U.S. Official Action dated Jun. 2, 2014 in U.S. Appl. No. 12/144,642, 32 pgs.
U.S. Official Action dated Jul. 1, 2014 in U.S. Appl. No. 12/372,386, 93 pgs.
Taiwan Seach Report dated May 7, 2014 cited in Appln No. 098117357, 13 pgs.
Japanese Notice of Allowance Issued in Patent Application No. 2011-550149, Mailed Date: May 8, 2014, Filed Date: Jan. 22, 2010, 4 pages. (MS# 325993.12).
Australian Second Office Action Issued in Patent Application No. 2010216342, Mailed Date: May 12, 2014, Filed Date: Jan. 22, 2010, 3 pages. (Ms# 325993.04).
Notice of Allowance Issued in Chinese Patent Application No. 200680032789.2, Mailed Date: May 15, 2014, Filed Date: Sep. 8, 2006, 3 pages.

(56) References Cited

OTHER PUBLICATIONS

Taiwan Seach Report dated May 12, 2014 cited in Appln No. 098119245, 11 pgs. (MS# 323861.03).
Russian Decision on Grant dated May 20, 2014 in Appln No. 2011145984/08, 24 pgs.
Japanese Final Decision of Rejection dated May 27, 2014 in Appln No. 2012-110939, 4 pgs.
EP Communication dated Jun. 2, 2014 in Appln No. 07 795 391.7, 9 pgs.
Chilean Second Office Action dated Jun. 6, 2014 in Appln No. 1987-2011, 12 pgs.
Russian Decision on Grant dated Jul. 20, 2014 in Appln No. 2010138162, 14 pgs.—No English Language Translation.

* cited by examiner

USER INTERFACE FOR PROVIDING TASK MANAGEMENT AND CALENDAR INFORMATION

RELATED APPLICATIONS

This application is a Continuation of co-pending U.S. application Ser. No. 10/955,928 entitled "User Interface for Providing Task Management and Calendar Information" filed Sep. 30, 2004, which is incorporated herein by reference.

FIELD OF THE INVENTION

The present invention generally relates to calendar, scheduling and time management systems. More particularly, the present invention relates to an improved user interface for providing task management and calendar information.

BACKGROUND

With the advent of the computer age, computer and software users have grown accustomed to user-friendly software applications that help them write, calculate, organize, prepare presentations, send and receive electronic mail, make music, and the like. For example, electronic mail systems allow users to send, receive, respond to and store a variety of mail messages and related information. Electronic calendar applications allow users to store, organize and view meeting dates and appointments. Electronic task management applications allow users to store, organize and view a variety of tasks that a user must complete or desires to complete according to various time schedules.

However, even with the available functionality of such systems, some users desire a short list of upcoming meetings, appointments or tasks. Indeed, many users of modern electronic calendar systems and task management applications often create paper "to-do" lists that they stick onto their computer monitors or place in a conspicuous location to remind them of upcoming meetings, appointments or tasks because of a tendency they have to prepare exhaustive calendars or task lists only to forget to review the calendars or task lists at a necessary frequency. Other users use paper calendar or time management systems for the same purpose.

Accordingly, there is a need in the art for an electronic user interface for providing an electronic "To-Do" list of upcoming events or tasks that may be populated from an electronic calendar application or task management application maintained separately by a user. It is with respect to these and other considerations that the present invention has been made.

SUMMARY

Embodiments of the present invention solve the above and other problems by providing an electronic "To-Do" bar or list (hereinafter "To-Do bar") in which a user may be presented a display of upcoming tasks, meetings, appointments and the like. According to aspects of the invention, the electronic To-Do bar may be utilized in association with a multi-functionality software application, or the electronic To-Do bar may be used independently of other software applications. The electronic To-Do bar is a user interface pane in which may be displayed tasks, meetings and appointments. The To-Do bar is displayed persistently in addition to other software functionality or user interfaces displayed on a user's computer display screen according to other software applications or other software functionality in use. Thus, the user is presented with an always-visible list of upcoming tasks, meetings and appointments without the need to launch a separate tasks application or calendar application to view upcoming tasks, meetings or appointments.

According to aspects of the invention, the To-Do bar includes an appointment view component in which is displayed one or more upcoming meetings or appointments. The To-Do bar also includes a task list in which may be displayed upcoming tasks. The task list may be displayed according to a variety of arrangement criteria, and a scroll bar may be provided to allow a user to see tasks that will not fit into available display space for the task list. The To-Do bar may also include a date picker control for selectively launching a separate calendar application, or onto which task items may be dropped for inclusion in the task list according to a date in the date picker control onto which a give task item is dropped. A task input field or panel may be included in the To-Do bar to allow the user to enter new tasks directly into the To-Do bar.

The meetings and appointments information displayed in the appointment view component are imported from a memory location populated via a separate calendar application. The task list may be populated from tasks stored by and entered through a separate tasks application, or from other data including electronic mail items that are flagged as tasks items. In addition, tasks may be added to the task list via the aforementioned task input panel.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved user interface for providing task management and calendar information in a persisted computer-generated To-Do list or bar. The electronic To-Do bar of the present invention provides a list of upcoming tasks, meetings and appointments populated from a separately maintained electronic calendar and/or task management application.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
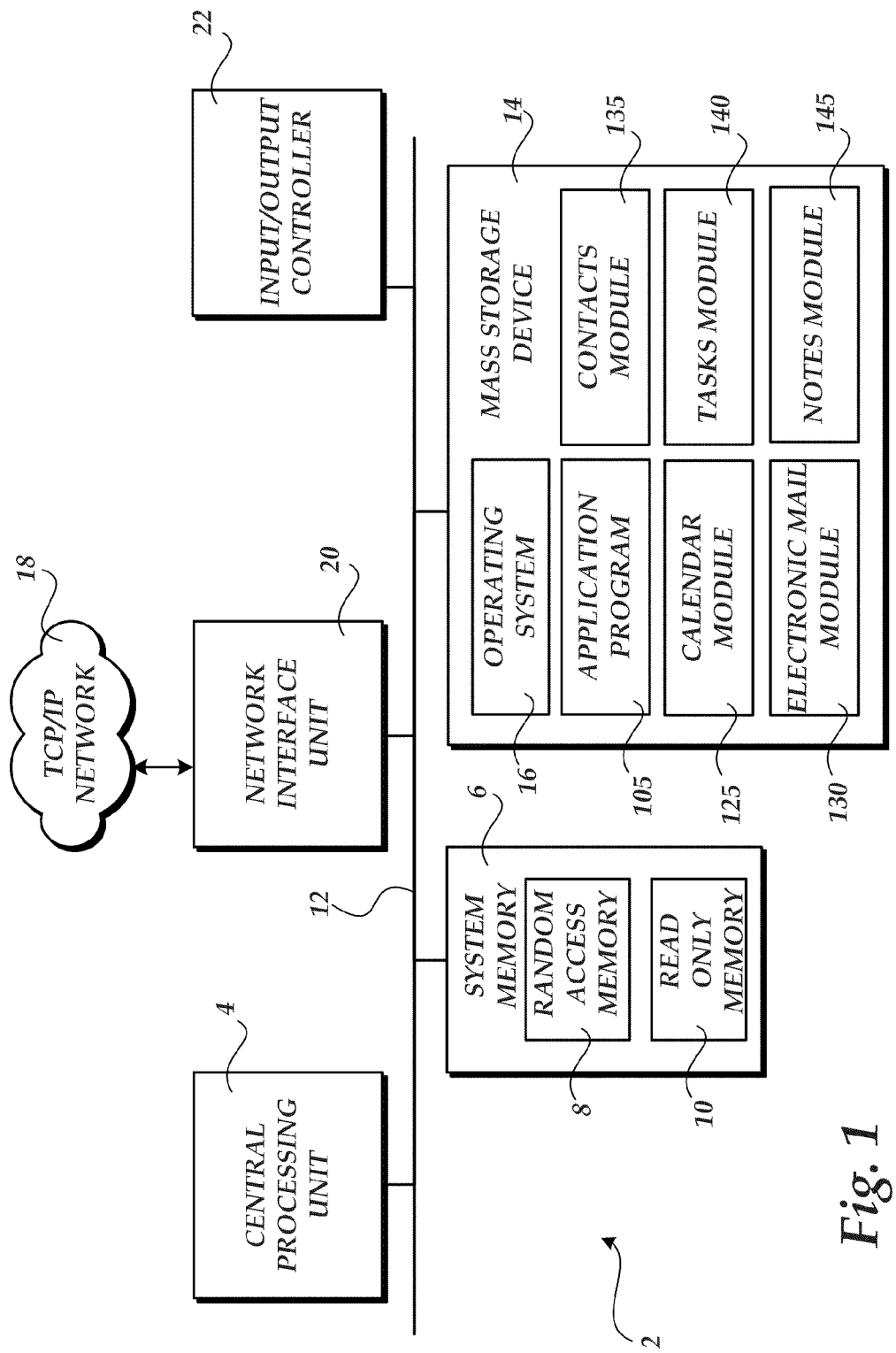
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application 105 for providing a variety of functionalities to a user. For instance, the application 105 may comprise many types of programs such as a word processing application program, a spreadsheet application, a desktop publishing, and the like. According to an embodiment of the present invention, the application 105 comprises a multiple functionality software application for providing a user calendar functionality, electronic tasks functionality, electronic mail functionality, contacts information functionality, electronic notes functionality, electronic journal functionality and the like. Some of the individual program modules comprising the multiple functionality application 105 include a calendar application 125, an electronic mail application 130, a contacts application 135, a tasks application 140, a notes application 145 and a journal application (not shown). An example of such a multiple functionality application 105 is OUTLOOK® manufactured by Microsoft Corporation.

Figure 2:
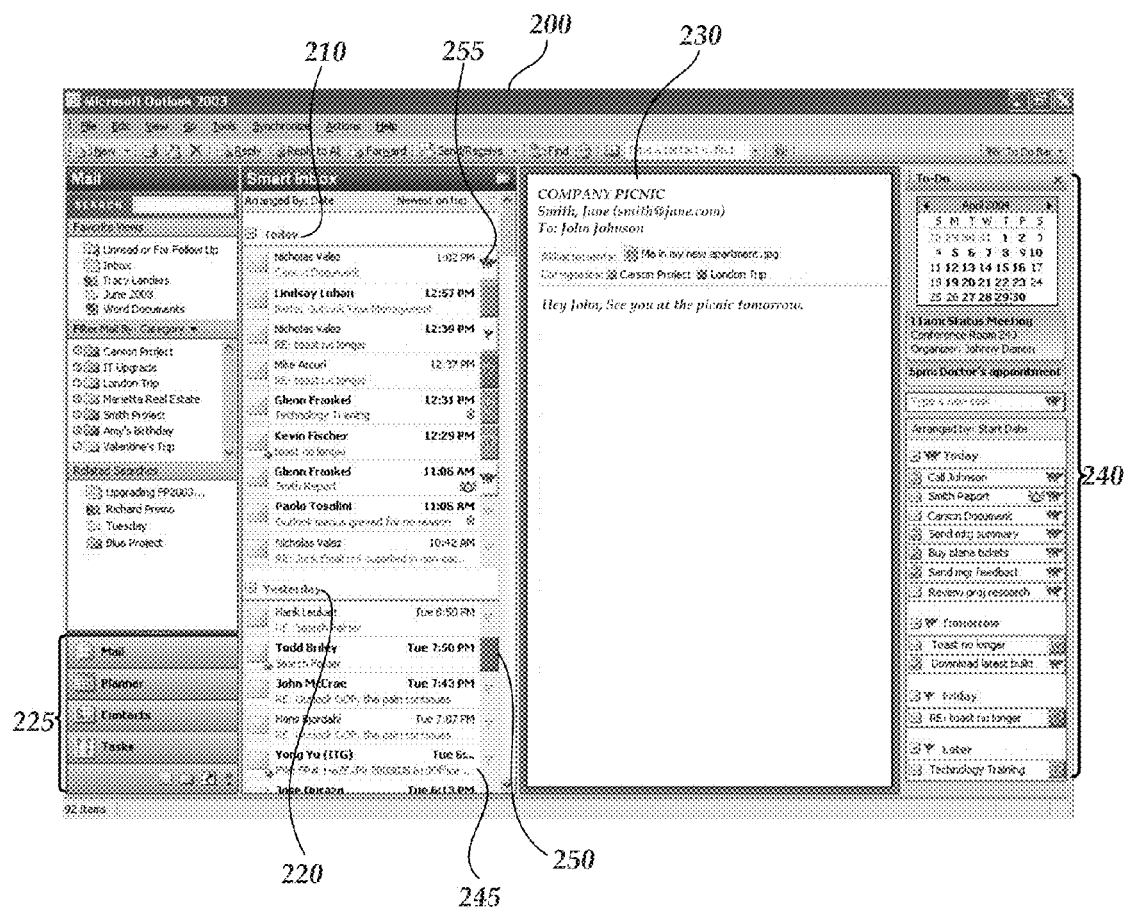
FIG. 2 illustrates a computer screen display showing an electronic To-Do bar or list according to embodiments of the present invention.

FIG. 2 illustrates a computer screen display of an electronic mail application user interface according to embodiments of the present invention. The user interface 200 is illustrative of an electronic mail application 130 user interface for displaying electronic mail items received, sent or stored in a variety of storage folders. An example electronic mail application user interface illustrated in FIG. 2 is provided by OUTLOOK® manufactured and marketed by Microsoft Corporation of Redmond, Wash.

The user interface 200, illustrated in FIG. 2, includes an inbox 210 with which a user may view a listing of electronic mail items that have been received by the user, that have been sent by the user, or which have been stored in one or more user-established storage folders. As illustrated in FIG. 2, a number of electronic mail items are listed in the inbox pane 210. To the right of the inbox 210, a reading pane or preview 230 is illustrated for displaying the contents of a selected mail item.

Along the lower left-hand corner of the user interface 200 is an application selection pane 225 containing selectable functionality controls for selecting other types of functionality provided by the multiple functionality software application 105 (described above) through which the user's electronic mail application is provided. For example, the display of the electronic mail user interface 200 is in response to selection of the "Mail" control. If the user wishes to launch a user interface associated with a tasks application 140, the user may select the "Tasks" control to launch the functionality of the tasks application 140 including presentation of a user interface 200 associated with the tasks application. Likewise, the user may select the "Contacts" control to launch the functionality of a contacts application 135 and an associated user interface 200 for displaying information and functionality for a contacts application 135.

Referring still to FIG. 2, a To-Do bar 240 is illustrated. According to embodiments of the invention, functionality of the To-Do bar 240 is provided by the multiple functionality application 105. As described below, according to one displayed embodiment of the present invention, the To-Do bar 240 includes a date picker control, an appointments/meetings view, a task input panel, and a task list. According to embodiments, the To-Do bar 240 is displayed along the right-hand side of the user interface 200 by default. However, as described below with respect to FIG. 9, the display of the To-Do bar 240 may be altered to accommodate different display screen sizes and configurations and to accommodate the particular requirements of other software application user interfaces.

According to embodiments of the present invention, the To-Do bar 240 is always displayed in the user interface 200 so that a user has a quick and easy view of upcoming meetings, appointments and tasks without the need to launch specific applications, for example, calendar applications and tasks applications, for obtaining that information. For example, if the "Contacts" control is selected from the control pane 225 to launch the functionality of a contacts application 135, along with an associated user interface 200, the To-Do bar 240 remains displayed in the user interface 200. Likewise, if the user then selects yet another application, for example, a tasks application 140, the display of the To-Do bar 240 remains persisted in the user interface. As described below, the user may dismiss the To-Do bar 240 from display if desired. However, according to embodiments of the present invention, a default setting for the To-Do bar 240 prescribes that the To-Do bar 240 remains displayed regardless of the displayed information or functionality displayed in other portions of the user interface 200 so that the user has a readily available listing of upcoming meetings, appointments and tasks.

According to embodiments of the invention, components of the To-Do bar 240 (task list, appointments/meetings view) may be populated with a number of appointments, meetings, tasks and task-like items that are aggregated by the To-Do bar from a variety of sources. That is, any data item that is marked for recognition by the To-Do bar may be retrieved by the To-Do bar from any memory source accessible by the To-Do bar. Once the To-Do bar retrieves such marked data items, the To-Do bar 240 aggregates the data items and displays them in one or more components of the To-Do bar. For example, any number of data items, including electronic mail items, meeting requests, meeting request responses, tasks, titles of reports, data items in spreadsheets, etc. may be marked for treatment as tasks. Once marked for treatment as tasks, the To-Do bar may search for the data items, aggregate the data items, and then display the data items in the task list of the To-Do bar. Likewise, the To-Do bar may search for items marked for treatment as meetings or appointments from sources such as electronic calendars. The To-Do bar may then aggregate and display the retrieved meetings or appointments items in the appointments/meetings view of the To-Do bar as described below. Example memory areas that may be searched by the To-Do bar include areas associated with other applications, for example, electronic mail applications, calendar applications, tasks applications, and the like.

Figure 3:
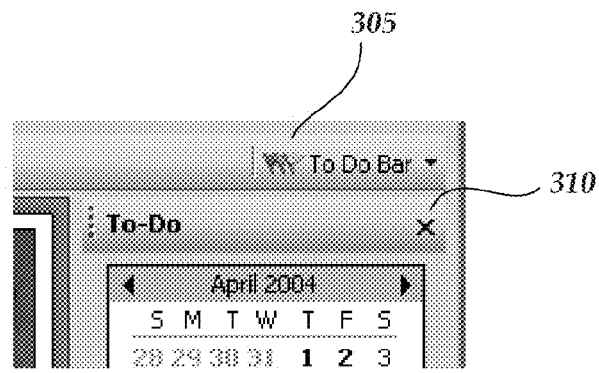
FIG. 3 is a computer screen display illustrating an example selectable control for opening or closing a To-Do bar according to embodiments of the present invention.

Referring to FIG. 3, the To-Do bar 240 may be selectively hidden from view based on a variety of user actions. For example, the close control 310 in the upper right-hand corner of the To-Do bar may be selected for hiding or dismissing To-Do bar 240. Alternatively, a To-Do bar button 305 may be disposed in a tool bar of functionality controls disposed along an upper edge or other location in the user interface 200 for selectively opening and closing the To-Do bar 240. Alternatively, a view menu may be provided where a user may select or deselect the To-Do bar 240 for/from display. According to yet another alternative, a function control, for example, ALT+F2, may be selected to toggle the To-Do bar 240 into an off position. Similarly, the To-Do bar 240 may be launched for display, as illustrated in FIG. 2, by selecting a To-Do bar button 305 in a tool bar of selectable functionality controls. A To-Do bar menu item may be selected from a view menu. Or, as described above, a function key such as ALT+F2 may be selected to toggle the To-Do bar 240 into an on (display) position.

Figure 4:
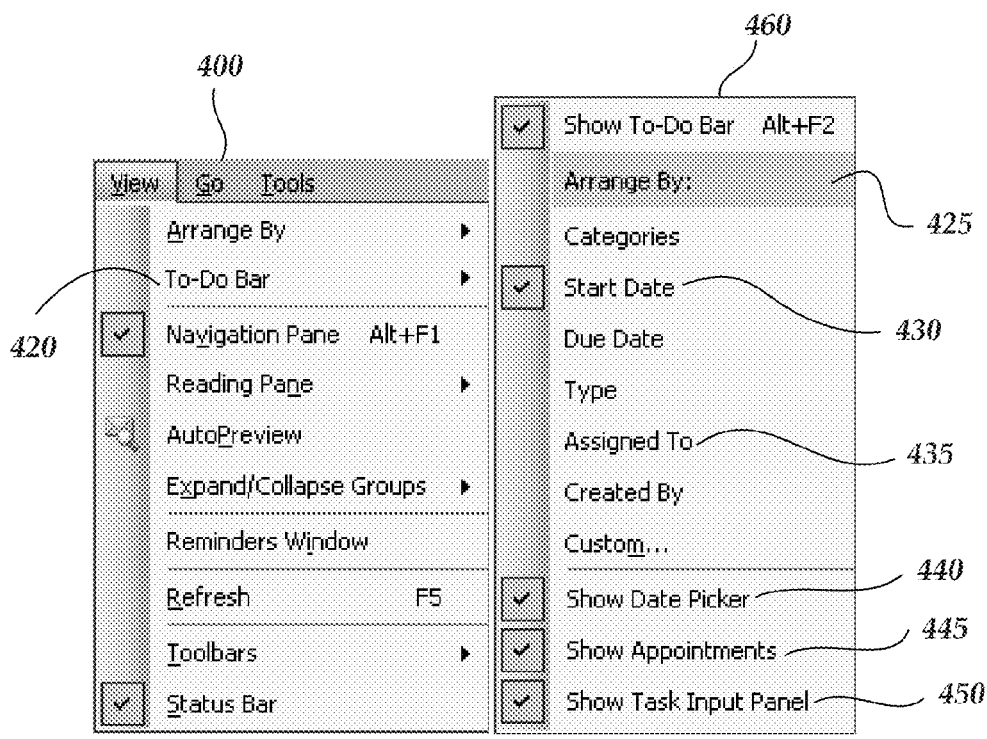
FIG. 4 illustrates a computer screen display of a view menu and view menu fly-out user interface for assigning view properties to a To-Do bar according to embodiments of the present invention.

Referring to FIG. 4, a view menu 400 is illustrated which may be launched according to embodiments of the present invention for selectively displaying the To-Do bar 240. Upon selection of the To-Do bar control 420 from the view menu 400, a fly-out menu 460 is provided to allow the user to set display properties with which information contained in the To-Do bar 240 will be displayed. As illustrated in FIG. 4, in the fly-out menu 460, the "Show To-Do Bar" control has been selected so that the To-Do bar 240 will be displayed in the user interface 200. A "Start Date" property 430 has been selected so that information contained in the To-Do bar 240 will be sorted according to start date. For example, other sorting categories for tasks and other information contained in To-Do bar 240 may be selected, for example, "Assigned To," "Created By," etc.

In a lower portion of the fly-out menu 460, controls are displayed for selecting various components for display (or, removal from display) in the To-Do bar 460. For example, a "Show Date Picker" control 440 has been selected so that the date picker user interface will be displayed in the To-Do bar 240. On the other hand, if the user has the To-Do bar 240 turned on while the user is viewing functionality and information associated with the user's calendar application 125, the user may turn off the meetings/appointments view from the To-Do bar 240 to make additional space in the To-Do bar 240 for additional tasks information. A "Show Appointments" control 445 has been selected so that the appointments/meetings view portion of the To-Do bar 240 will be displayed for showing upcoming meetings and appointments. A "Show task input panel" control has also been selected so that the task input panel of the To-Do bar 240 will be displayed in the To-Do bar 240. As should be understood, other controls from the fly-out menu 460 may be selected for applying other properties to the To-Do bar 240. As should be appreciated from the fly-out menu 460 and the associated description, the date picker control, the appointments/meetings view, and the task input panel may be selectively displayed or not displayed in the To-Do bar 240. In any case, by default, the tasks list of the To-Do bar 240 is always displayed. Thus, a user may customize the display of components of the To-Do bar 240, as described.

Figure 5:
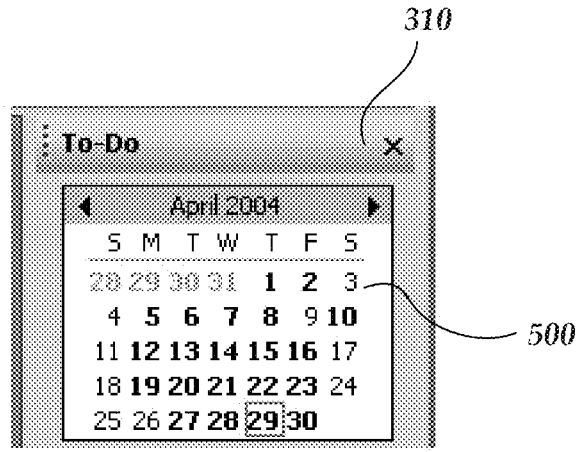
FIG. 5 illustrates a computer screen display showing a date picker control in a To-Do bar according to embodiments of the present invention.

Having described general aspects of the To-Do bar 240 in association with the user interface 200 with respect to FIGS. 2, 3 and 4, FIGS. 5-9 illustrate different components of the To-Do bar 240 and describe population and maintenance of data in the To-Do bar 240. Referring now to FIG. 5, the date picker control 500 is illustrated. According to embodiments of the present invention, regardless of the user's currently displayed application user interface, for example, contacts application user interface, electronic mail user interface, and the like, the To-Do bar 240 displays at least one date picker control 500 unless the control is turned off by the user. The date picker control 500 functions not only as a visible calendar, but additional information is provided based on the application of properties to the date numerals contained in the control 500. For example, a date containing a meeting or appointment is boldfaced, the current date is outlined in a red square. And, selection of a given date allows a user to navigate to information associated with that date. That is, according to one embodiment, by selection of a particular date, meetings, appointments or tasks associated with that date are populated into the To-Do bar 240. In addition, as described below, selection of a particular date may automatically launch the calendar application user interface into the user interface 200 to show calendar information associated with the date selected from the date picker control 500.

If the width of the To-Do bar 240 is increased, or if the height of the area of the To-Do bar 240 containing the date picker control 500 is increased, additional date pickers may be displayed as space permits. According to a preferred embodiment, unless the date picker control 500 is turned off by the user, at least one date picker control 500 is displayed in the To-Do bar 240. According to embodiments of the present invention, tasks from the task list in the To-Do bar 240 and tasks from the tasks application 140 may be dragged and dropped onto a particular date in the date picker control 500. Dropping a task onto a specific date in the date picker control 500 causes the start date for the dropped task to be changed to the date upon which the task is dropped. Similarly, electronic mail items from an electronic mail application may be dropped onto specific dates in the date picker control 500. Dropping an electronic mail item from an electronic mail inbox onto a particular date in the date picker control flags the mail item as a task, establishes a task in the task list in the To-Do bar 240 and sets as a start date for the task the date in the control 500 onto which the electronic mail item was dropped.

According to one embodiment, if the primary application in use by the user is a calendar application 125, the date picker control 500 will not appear in the To-Do bar 240. For non-calendar applications, for example, the tasks application 140, the contacts application 135, and the electronic mail application 130, selecting a day in the date picker control 500 immediately switches the displayed user interface to the calendar application user interface and selects the user's default calendar. The default calendar is changed to a day view and the calendar is moved to the day selected by the user in the date picker control 500. If a user changes the month displayed for the date picker control 500 in the To-Do bar 240, the calendar application 125 is not automatically launched unless the user selects a particular date in the displayed month in the date picker control 500.

Figure 6:
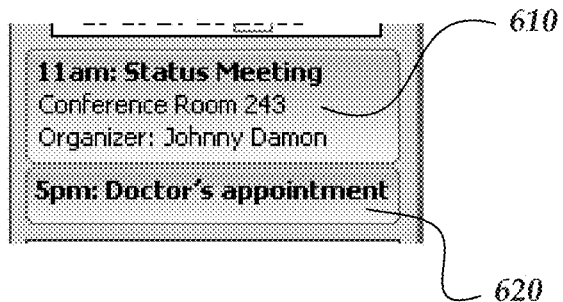
FIG. 6 illustrates a computer screen display showing an appointments/meetings view component of a To-Do bar according to embodiments of the present invention.

Referring now to FIG. 6, the appointments/meetings component of the To-Do Bar 240 is illustrated. A first appointment 610 and a second appointment 620 are illustrated in the appointments/meetings view. According to a preferred embodiment, and as illustrated in FIG. 6, a best-fit date is appended to the beginning of the appointment title. Double clicking on an appointment 610, 620 opens the full appointment item, and a secondary selection, for example, right-clicking on an appointment 610, 610, presents a context menu for the selected appointment for providing additional calendar and appointment functionality for the item. The appointments/meetings view area of the To-Do Bar 240 may be resized to add more appointments/meetings to the To-Do Bar 240. According to a preferred embodiment, a minimum of one appointment/meeting is displayed unless the user turns off the appointments/meetings view.

Figure 7:
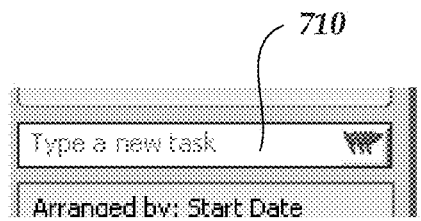
FIG. 7 illustrates a computer screen display showing a task input panel of a To-Do bar according to embodiments of the present invention.

Referring now to FIG. 7 (and referring still to FIG. 2), a task input panel 710 is provided. A task input panel 710 is an edit box that allows a user to type the title of a new task the user wishes to add to the tasks list and to tasks memory associated with a separate tasks application 140. If the user enters a task title into the task input panel 710, a new task is immediately created with the specified title and is added to the bottom of the currently set day in the task list.

A flag icon is illustrated on the right side of the task input panel. As is known to those skilled in the art, flag icons may be utilized to identify an item as being flagged with certain properties. For example, a triple flag icon, as illustrated in the task input panel 710, may indicate that the flagged item has a start date of today. A double flag icon may indicate that the flagged item has a start date within the current week, and a single flag icon may indicate that the flagged item has a start date past the current week. Additionally, a colored box may be utilized around the flagged icon such as the colored box 250, illustrated in FIG. 2, to indicate other properties such as a system-defined or user-defined category for the task. For example, all tasks having To-Do with a given work project may be associated with the color green, all tasks associated with a personal project may be associated with the color orange, and so on.

According to embodiments of the present invention, the user may edit the properties associated with a given task item by selecting the flagged icon or deploying a menu of properties that may be used for editing flagging associated with a given item. For example, a context menu launched in response to selecting the flagging icon may allow the user to change the start date of the associated task from this week to next week, for example. For another example, the user may selectively change a category associated with the task, for example, work project category to personal project category. For a detailed description of task flagging, see U.S. patent application Ser. No. 10/955,232, entitled "Method and System For Improved Electronic Task Creation And Management," which is incorporated herein by reference as if fully set out herein.

Figure 8:
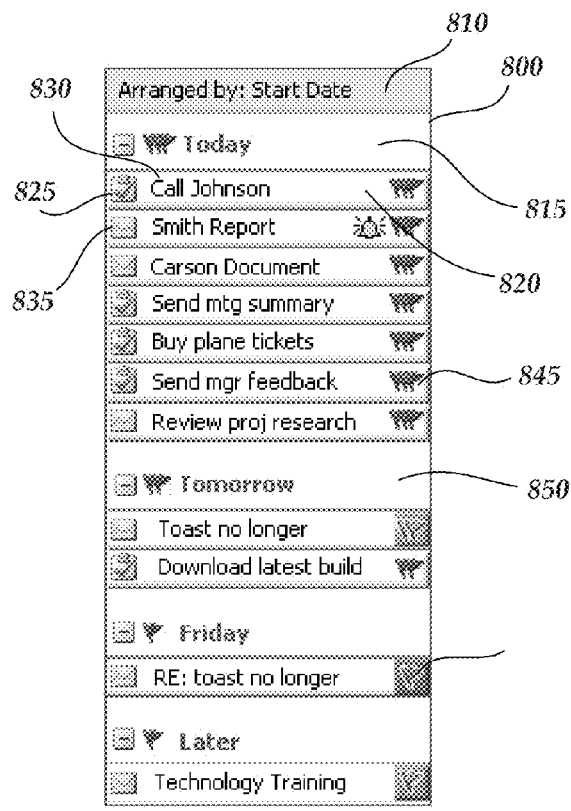
FIG. 8 illustrates a computer screen display of a task list of a To-Do bar according to embodiments of the present invention.

Referring now to FIG. 8, the task list illustrated in the To-Do Bar 240 (illustrated in FIG. 2) is described. The task list 800 includes a field 810 identifying the sorting or arrangement property associated with the task list. According to embodiments of the present invention, tasks included in the task list 800 may be arranged by category, start date, due date, assigned to, created by, type, or custom. According to a custom arrangement, users may define a manner in which individual task items will be arranged or grouped. As should be appreciated, the sections and tasks illustrated in the task list 800 are for purposes of example only and are not restrictive of the variety of different tasks that may be displayed and the different sorting criteria that may be utilized in arranging tasks displayed in the task list 800.

The task list 800 illustrated in FIG. 8 is arranged by "Start Date." Accordingly, a "Today" section is illustrated at the top of the task list 800 under which is included tasks bearing a start date of today. A "Tomorrow" section 840 is illustrated under which are included tasks having a start date of tomorrow. Also illustrated in the task list 800 are a "Friday" section and a "Later" section. According to embodiments of the present invention, task items grouped under such groupings are tracked and are moved to different groupings, as required. For example, a task item that is presently grouped under the heading "Tomorrow" will be moved to the "Today" grouping or section after midnight of the present day. The grouping headings associated with a "Start Date" arrangement may include a number of headings such as "Today," "Tomorrow," "Monday," "Tuesday," "Wednesday," "Thursday," "Friday," "Saturday," "Sunday," "This Week," "Next Week," "Two Weeks Away," "Three Weeks Away," "Next Month," and "Beyond Next Month," and so on. As should be understood, the foregoing list of potential headings is by way of example and is not limiting of the variety of headings that may be used by the To-Do bar for organizing items in the task list.

Individual task items may be placed in various arrangement groupings as decided by a user. According to embodiments of the present invention, individual task items may be dragged and dropped from one grouping to another. For example, referring to FIG. 8, a task item that is currently under the "Tomorrow" heading 840 may be dragged and dropped to the grouping under the "Today" heading 815 if the user determines that the associated task needs to start today rather than tomorrow. If the user drops a task item into a different grouping, the task item is immediately moved to the new grouping, and associated flag icons 845 are changed to reflect the new position of the affected task item. In addition, a user may manually reorder tasks within a particular grouping if desired. For example, referring to FIG. 8, a user may reorder the task items listed under the "Today" heading 815 to emphasize to the user a preferred order for initiating the tasks contained in the affected grouping.

For each task contained in the task list 800, a title 830 is included to identify the title and/or nature of the task. On the left-hand side of each of the individual tasks, icons may be provided to identify the source of a given task. For example, the icon 825 may be utilized to identify that the associated task has been retrieved from information input from a tasks application 140. The envelope icon 835 may be utilized to indicate that the associated task is a task flagged from a received electronic mail item. The flagging icon 845 illustrated on the right-hand side of individual tasks are for indicating information regarding the start dates for the associated task and the categories applied to the associated task, as described above.

Figure 9:
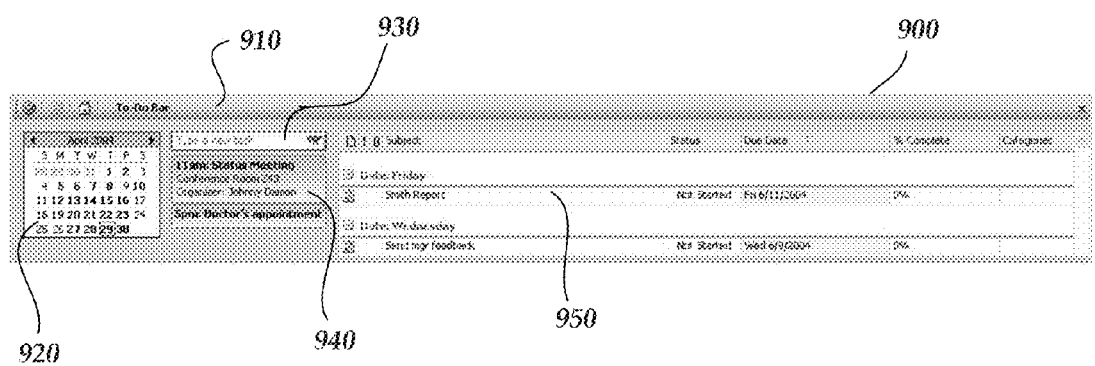
FIG. 9 illustrates a computer screen display showing an alternate display of a To-Do bar according to embodiments of the present invention.

Referring now to FIG. 9, an alternate display format for the To-Do Bar is illustrated. As should be appreciated, some shapes and sizes of computer display screens, and certain software application user interface layouts may require a different display layout for the To-Do Bar 240. Referring to FIG. 9, a display layout for the To-Do Bar is illustrated for displaying the To-Do Bar along an upper or lower edge of a computer screen display and/or user interface display. The To-Do Bar 900, illustrated in FIG. 9, includes a date picker control 920 disposed along a left side of the To-Do Bar 900. A task input panel 930 and an appointments/meetings view pane 940 are disposed horizontally adjacent to the date picker control 920. The task list 950 is disposed on the right side of the horizontally-oriented To-Do Bar 900. As should be appreciated, utilization of a To-Do Bar according to an alternate layout, such as illustrated in FIG. 9, may allow additional information to be displayed in the Task list or the appointments/meetings view. For example, given additional horizontal space available for Task items in the alternate display layout, illustrated in FIG. 9, additional text may be displayed for each of a number of task items.

As described herein, an improved user interface for providing task management and calendar information in a persisted computer-generated To-Do list or bar is provided. The electronic To-Do bar provides a list of upcoming tasks, meetings and appointments populated from a separately maintained electronic calendar and/or task management application. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

What is claimed is:

1. A method for providing a persistently displayed user interface portion within a multi-functionality application interface, the method comprising:

providing, by a computer, a multi-functionality application;

displaying, by the multi-functionality application interface, a to-do user interface bar having at least one component associated with at least one application of the multi-functionality application, the to-do user interface bar being persistently visible regardless of which application of the multi-functionality application is currently running;

searching for at least one data item from a plurality of memory sources, wherein the plurality of memory sources are associated with the multi-functionality application, and wherein data items comprise: electronic mail items, meeting requests, meeting request responses, tasks, and titles of reports;

determining that the at least one data item is marked for treatment as a task associated with a task application of the multi-functionality application;

in response to determining that the at least one data item is marked for treatment as the task, designating the at least one data item as at least one task item;

aggregating the at least one data item designated as at least one task item for display in the to-do user interface; and providing, within the to-do user interface bar, a task component for displaying the at least one task item associated with the task application of the multi-functionality application and a date picker component for displaying a calendar associated with a calendar application of the multi-functionality application.

2. The method of claim 1, wherein providing, within the to-do user interface bar, the date picker component comprises displaying, within the to-do user interface bar, a calendar for allowing a selection of a date.

3. The method of claim 1, further comprising displaying, within the to-do user interface bar, at least one appointment item associated with a date selected at the date picker component.

4. The method of claim 1, further comprising associating the at least one task item provided in the task component of the to-do user interface bar with a date provided by the date picker component of the to-do user interface bar, wherein associating the at least one task item with the date comprises associating the at least one task item with the date in response to a dragging of the at least one task item to the date picker component and a dropping of the at least one task item at the date provided by the date picker component.

5. The method of claim 4, wherein associating the at least one task item with the date in response to the dragging of the at least one task item to the date picker component and the dropping of the at least one task item at the date provided by the date picker component comprises associating the at least one task item with the date over which the dropping of the at least one task item component occurred.

6. The method of claim 1, further comprising:
establishing, in response to a dragging of a mail item provided in a mail application of the multi-functionality application and a subsequent dropping of the mail item at the date picker component provided in the to-do user interface bar, the mail item as a task item for provision in at least one of the following: the task application of the multi-functionality application and the task component of the to-do user interface bar, and associating the task item with a date provided by the date picker component.

7. The method of claim 6, further comprising populating a task list with the mail item.

8. The method of claim 1, further comprising providing, within the to-do user interface bar, an appointments component for displaying at least one appointment item associated an appointment application of the multi-functionality application.

9. The method of claim 8, further comprising:
executing at least one operation associated with the appointment application of the multi-functionality application in response to a primary selection of the at least one appointment item, and
displaying a menu for providing selections of additional operations associated with the appointment application of the multi-functionality application in response to a secondary selection of the at least one appointment item.

10. The method of claim 1, further comprising providing, within the to-do user interface bar, a task input panel for adding tasks, the tasks being associated with at least one of the following: the task component of the to-do user interface bar and the task application of the multi-functionality application.

11. The method of claim 1, further comprising associating a category with the at least one task item, wherein associating the category with the at least one task item comprises assigning a color to be associated with the at least one task item.

12. The method of claim 1, further comprising deploying a menu associated with the at least one task item, the menu comprising at least one of the following: flagging properties, date properties, and category properties of the at least one task item.

13. The method of claim 1, further comprising arranging, within the to-do user interface bar, the at least one task item provided by the at task component according to at least one of the following: date properties associated with the at least one task item and category properties associated with the at least one task item.

14. The method of claim 1, further comprising arranging, with the to-do user interface bar, the at least one task item under a first dated heading corresponding to a date property of the at least one task item.

15. The method of claim 14, modifying the date property of the at least one task item in response to a dragging of the at least one task item from the first dated heading and a subsequent dropping of the at least one task item at a second dated heading.

16. The method of claim 1, wherein providing the multi-functionality application comprises providing the following:
an email application, a contacts application, an appointments application, and a tasks application.

17. The method of claim 1, wherein displaying, by the multi-functionality application interface, the to-do user interface bar comprises displaying the to-do user interface bar in a window that also displays the at least one application of the multi-functionality application.

18. A computer-readable storage device which stores a set of instructions which when executed by a computer perform a method for providing a persistently displayed to-do user interface portion within a multi-functionality application interface, the method executed by the set of instructions comprising:
providing a multi-functionality application;
displaying, by the multi-functionality application interface, a persistently visible to-do user interface bar having components associated with at least one application of the multi-functionality application, wherein displaying, within the multi-functionality application interface, the persistently visible to-do user interface comprises displaying the to-do user interface bar within the multi-functionality application interface regardless of which application of the multi-functionality application is also displayed in the multi-functionality application interface;
searching for at least one data item from a plurality of memory sources, wherein the plurality of memory sources are associated with the multi-functionality application, and wherein data items comprise: electronic mail items, meeting requests, meeting request responses, tasks, and titles of reports;
determining that the at least one data item is marked for treatment as a task associated with a task application of the multi-functionality application;
in response to determining that the at least one data item is marked for treatment as the task, designating the at least one data item as at least one task item;
aggregating the at least one data item designated as at least one task item for display in the to-do user interface; and
providing, within the to-do user interface bar, a task component for displaying at the least one task item associated with the task application of the multi-functionality application.

19. The computer-readable storage device of claim 18, further comprising providing, within the to-do user interface bar, an appointments component for displaying at least one appointment item associated an appointment application of the multi-functionality application.

20. The computer-readable storage device of claim 18, further comprising associating a category with the at least one task item, wherein associating the category with the at least one task item comprises assigning a color to be associated with the at least one task item.

21. The computer-readable storage device of claim 18, further comprising deploying, in response to a selection of the at least one task item, a menu associated with the at least one task item, the menu comprising at least one of the following: flagging properties, date properties, and category properties of the at least one task item.

22. The computer-readable storage device of claim 18, further comprising arranging, within the to-do user interface bar, the at least one task item provided by the at task component according to at least one of the following: date properties associated with the at least one task item and category properties associated with the at least one task item.

23. A system for providing a persistently displayed to-do user interface portion within a multi-functionality application interface, the system comprising:
- a memory storage device; and
- a processing unit coupled to the memory storage device, wherein the processing unit is operative to:
  - provide a multi-functionality application comprising at least one of the following: an email application, a contacts application, an appointments application and a tasks application,
  - persistently display, by the multi-functionality application interface, a to-do user interface bar comprising the following:
    - a task component for displaying at least one task item associated with the task application of the multi-functionality application, wherein the at least one task item comprises modifiable, within the to-do user interface bar, date properties and category properties, and
    - an appointments component for displaying at least one appointment item associated with the appointment application of the multi-functionality application, and
  - provide a control, within the multi-functionality application, that is configured to, upon selection:
    - hide the to-do user interface bar when the to-do user interface bar is being displayed,
    - display the to-do user interface bar when the to-do user interface bar is not being displayed,
  - search for at least one data item from a plurality of memory sources, wherein the plurality of memory sources are associated with the multi-functionality application, and wherein data items comprise: electronic mail items, meeting requests, meeting request responses, tasks, and titles of reports,
  - determine that the at least one data item is marked for treatment as a task associated with a task application of the multi-functionality application,
  - designate the at least one data item as at least one task item in response to determining that the at least one data item is marked for treatment as the task, and
  - aggregating the at least one data item designated as at least one task item for display in the to-do user interface.

24. The system of claim 23, wherein the processing unit is further operative to adjust a size of the to-do user interface bar as an interface size of the multi-functionality application is adjusted.

* * * * *